United States Patent
Hua et al.

(10) Patent No.: US 11,582,113 B2
(45) Date of Patent: Feb. 14, 2023

(54) PACKET TRANSMISSION METHOD, APPARATUS, AND SYSTEM UTILIZING KEEPALIVE PACKETS BETWEEN FORWARDING DEVICES

(71) Applicant: Huawei Technologies Co., Ltd., Shenzhen (CN)

(72) Inventors: Rongrong Hua, Nanjing (CN); Zhouyi Yu, Beijing (CN); Tao Peng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/468,126

(22) Filed: Sep. 7, 2021

(65) Prior Publication Data

US 2021/0409288 A1    Dec. 30, 2021

Related U.S. Application Data

(63) Continuation of application No. PCT/CN2020/118829, filed on Sep. 29, 2020.

(30) Foreign Application Priority Data

Feb. 21, 2020  (CN) .......................... 202010109060.2

(51) Int. Cl.
*H04L 41/5003* (2022.01)
*H04L 12/28* (2006.01)
(Continued)

(52) U.S. Cl.
CPC ...... *H04L 41/5003* (2013.01); *H04L 12/2859* (2013.01); *H04L 12/6418* (2013.01); *H04L 2012/6448* (2013.01); *H04L 2101/622* (2022.05)

(58) Field of Classification Search
CPC ............. H04L 12/2859; H04L 12/6418; H04L 2101/622; H04L 2012/6448; H04L 41/5003
(Continued)

(56) References Cited

U.S. PATENT DOCUMENTS 6,073,176 A * 6/2000 Baindur ............... H04L 12/2859
                                                             709/227
6,618,355 B1 * 9/2003 Gulliford ............... H04M 15/58
                                                             370/468
(Continued)

FOREIGN PATENT DOCUMENTS

CN       101325557 A    12/2008
CN       102769573 A    11/2012
(Continued)

OTHER PUBLICATIONS

CN-103370903-A English translation, pp. 1-10 (Year: 2013).*
(Continued)

*Primary Examiner* — David P Zarka
(74) *Attorney, Agent, or Firm* — Slater Matsil, LLP

(57) ABSTRACT

This application provides a packet transmission method, apparatus, and system, and relates to the field of network technologies. The method is applied to a network architecture including a user terminal, a first forwarding device and a second forwarding device. A tunnel is disposed between the first forwarding device and the second forwarding device. The method includes: The first forwarding device receives packets forwarded by the user terminal in the load balancing mode, where the packets include a keepalive packet, and the first forwarding device is a standby forwarding device corresponding to the user terminal. The first forwarding device forwards the keepalive packet to the second forwarding device through the tunnel, where the
(Continued)

second forwarding device is an active forwarding device corresponding to the user terminal.

12 Claims, 14 Drawing Sheets

(51) Int. Cl.
  *H04L 12/64* (2006.01)
  *H04L 101/622* (2022.01)
(58) Field of Classification Search
  USPC .......................................................... 709/224
  See application file for complete search history.

(56) References Cited

U.S. PATENT DOCUMENTS

| | | | | |
|---|---|---|---|---|
| 6,880,089 | B1* | 4/2005 | Bommareddy | H04L 61/2596 709/200 |
| 8,693,313 | B2* | 4/2014 | Negoto | H04L 45/28 370/219 |
| 11,012,259 | B1* | 5/2021 | McConnaughay | H04L 69/22 |
| 2007/0064698 | A1* | 3/2007 | Appanna | H04L 45/00 370/392 |
| 2009/0073990 | A1 | 3/2009 | Patil et al. | |
| 2014/0372567 | A1* | 12/2014 | Ganesh | H04L 67/1001 709/219 |
| 2015/0301912 | A1* | 10/2015 | Rubin | H04W 36/0016 714/4.11 |
| 2016/0087907 | A1* | 3/2016 | Ajitomi | H04L 47/28 370/389 |
| 2016/0328251 | A1* | 11/2016 | Bernstein | H04L 12/4633 |
| 2018/0123872 | A1* | 5/2018 | Zhang | H04L 43/0817 |
| 2020/0007465 | A1* | 1/2020 | Wu | H04L 47/821 |
| 2021/0409288 | A1* | 12/2021 | Hua | H04W 28/0268 |

FOREIGN PATENT DOCUMENTS

| | | | | |
|---|---|---|---|---|
| CN | 103370903 | A * | 10/2013 | ......... H04L 41/0663 |
| CN | 108712344 | A | 10/2018 | |
| CN | 109039888 | A | 12/2018 | |
| CN | 109194521 | A | 1/2019 | |
| CN | 110572290 | A | 12/2019 | |
| ES | 2429396 | A2 * | 11/2013 | ........... H04L 43/028 |

OTHER PUBLICATIONS

ES-2429396-A2 English translation, pp. 1-13 (Year: 2013).*
Hu, S. et al., "The China Mobile, Huawei, and ZTE BNG; Simple Control ad User Plane Separation Protocol (S-CUSP)", draft-chz-simple-cu-separation-bng-protocol-06, Oct. 19, 2019.

* cited by examiner

PACKET TRANSMISSION METHOD, APPARATUS, AND SYSTEM UTILIZING KEEPALIVE PACKETS BETWEEN FORWARDING DEVICES

CROSS-REFERENCE TO RELATED APPLICATIONS

This application is a continuation of International Application No. PCT/CN2020/118829, filed on Sep. 29, 2020, which claims priority to Chinese Patent Application No. 202010109060.2, filed on Feb. 21, 2020. The disclosures of the aforementioned applications are hereby incorporated by reference in their entireties.

TECHNICAL FIELD

This application relates to the field of network technologies, and in particular, to a packet transmission method, apparatus, and system.

BACKGROUND

With development of network technologies, in a user broadband access scenario, to meet requirements of increasing internet service types for user access bandwidth, a quantity of user sessions supported by broadband network gateway (BNG) devices, and the like, the BNG devices are used in a system architecture based on a software defined network (SDN) and network function virtualization (NFV), so that the BNG devices are decoupled into control plane (CP) devices and user plane (UP) devices.

A CP device can manage a plurality of UP devices, and further the CP device can manage a plurality of user terminals that access a network through the UP devices, to implement flexible scheduling of the user terminals between the UP devices. In this way, to implement load balancing on user-side links, as shown in FIG. 1, two UP devices managed by one CP device may be connected to a same switch (SW) or a same optical line termination (OLT) device over two user-side links. When a user terminal requests to access the network through the SW/OLT, the CP device may determine, based on a hash operation result of a media access control (MAC) address of the user terminal, whether the current MAC address of the user terminal is an odd MAC address or an even MAC address, and connect the user terminal to a different UP device based on whether the MAC address of the user terminal is an odd MAC address or an even MAC address. For example, a user terminal in with an odd MAC address is connected to the network through a UP 131, and a user terminal 112 with an even MAC address is connected to the network through a UP 132. Alternatively, the CP device determines a quantity of sessions loaded on the UP devices, and connects the user terminal to a UP device with a smaller quantity of sessions. For example, the user terminal in is connected to the network through the UP 131, and the user terminal 112 is connected to the network through the UP 132. In this way, load balancing is implemented on the user-side links between the user terminals and the UP devices. In the foregoing two load balancing methods, traffic of the user terminal in is subsequently forwarded over only a user-side link 121 between the user terminal in and the UP 131, and traffic of the user terminal 112 is subsequently forwarded over only a user-side link 112 between the user terminal 112 and the UP 132. However, actually, traffic of different user terminals differs greatly. When an elephant flow emerges in uplink traffic of a user terminal corresponding to a user-side link, load on the user-side link is extremely high, and transmission quality is affected.

SUMMARY

A packet transmission method provided in this application can improve utilization of a user-side link while implementing load balancing of packet transmission on the user-side link.

To achieve the foregoing objectives, the following technical solutions are used in this application.

According to a first aspect, a packet transmission method provided in this application is applied to a network architecture including a user terminal, a first forwarding device and a second forwarding device. There is a tunnel disposed between the first forwarding device and the second forwarding device. Packets of the user terminal are forwarded to the first forwarding device and the second forwarding device in a load balancing mode. The method may include: The first forwarding device receives packets forwarded by the user terminal in the load balancing mode, where the packets include a keepalive packet, and the first forwarding device is a standby forwarding device corresponding to the user terminal. The first forwarding device forwards the keepalive packet to the second forwarding device through the tunnel, where the second forwarding device is an active forwarding device corresponding to the user terminal.

The packets of the user terminal are transmitted to the first forwarding device and the second forwarding device through an SW/OLT. The load balancing mode may include that, for example, two user-side links (physical links) are bundled into one logical link by using a link aggregation group (LAG) technology, where the two user-side links include a link connecting the SW/OLT to the first forwarding device and a link connecting the SW/OLT to the second forwarding device.

In this way, when the packets of the user terminal are transmitted to the SW/OLT, a load balancing operation is performed, so that the packets are transmitted to the two forwarding devices over the two user-side links, thereby implementing load balancing on the user-side links.

Further, when a user route corresponding to a user terminal can be configured on only one forwarding device for some services (for example, broadband services), in this embodiment of this application, a tunnel may be configured between two forwarding devices, so that packets are forwarded to an active forwarding device (a forwarding device configured with a user route) through the tunnel after a standby forwarding device (a forwarding device on which no user route is configured) receives the packets. This prevents packet loss caused when the packets are forwarded to the forwarding device on which no user route is configured.

In this way, when the packets of the user terminal are transmitted in the load balancing mode, it can be ensured that utilization of the user-side link is improved and load on the user-side link is reduced.

In a possible implementation, the packets further include data packets. The method further includes: If the second forwarding device is further configured to perform traffic statistics collection and quality of service QoS processing on the data packets, the first forwarding device forwards a data packet to the second forwarding device through the tunnel.

For example, the packets of the user terminal may include a signaling packet, for example, a keepalive packet for confirming a "live status" of a peer end; and the packets of the user terminal may further include the data packets, for example, traffic data uploaded or downloaded by the user terminal. Performing traffic statistics collection on the data packets refers to calculating an amount of traffic to obtain real-time traffic data. Quality of service (QoS) processing may be performed to provide different quality of service for different requirements of various user terminals. For example, if an internet access rate of 300.0 Mbps can meet a user requirement for an ordinary home broadband user terminal, rate limiting processing may be performed on data packets corresponding to the user terminal to limit bandwidth allocated to the user terminal, and more bandwidth is allocated to a device with a higher bandwidth requirement.

Traffic statistics collection and quality of service QoS processing on the data packets need to be performed on complete data packets transmitted by the user terminal. After receiving the data packets of the user terminal, the standby forwarding device needs to forward the data packet to the active forwarding device through the tunnel, and the active forwarding device forwards the data packet after performing traffic statistics collection and quality of service QoS processing.

In a possible implementation, the packets further include data packets. The method further includes: If the second forwarding device is not configured to perform traffic statistics collection and quality of service QoS processing on the data packets, the first forwarding device directly forwards a data packet to a destination device of the data packet.

For example, a device that performs traffic statistics collection and quality of service QoS processing on the data packets may be another device. For example, the SW/OLT performs traffic statistics collection and quality of service QoS processing on the data packets. After data packets of the user terminal are forwarded to the first forwarding device and the second forwarding device by the SW/OLT in the load balancing mode, the first forwarding device does not need to forward the data packet to the second forwarding device, and the first forwarding device and the second forwarding device may directly forward the received data packets to a network.

In a possible implementation, the network architecture further includes a control device. Before the first forwarding device receives the packets of the user terminal forwarded in the load balancing mode, the method further includes: The first forwarding device receives a dial-up request broadcast by the user terminal. The first forwarding device sends the dial-up request to the control device, and receives user entry information sent by the control device, where the user entry information is used to indicate that the first forwarding device is the standby forwarding device corresponding to the user terminal.

For example, the control device may be a BNG control plane (BNG-CP). The first forwarding device and the second forwarding device are BNG user planes (BNG-UP). After receiving the dial-up request sent by the user terminal, the first forwarding device forwards the dial-up request to the control device, completes identity authentication for the user terminal by using the control device, obtains the user entry information determined by the control device, and further determines, based on the user entry information, that the first forwarding device is the standby forwarding device corresponding to the user terminal. In this way, after the identity authentication for the user terminal is completed and identities of the active forwarding device and the standby forwarding device are determined, a corresponding action may be performed on the packets transmitted by the user terminal, so that the user terminal goes online.

In a possible implementation, the user entry information is determined by the control device based on a media access control MAC address of the user terminal or a quantity of sessions that are of the first forwarding device and the second forwarding device.

For example, the control device determines, based on the MAC address of the user terminal, whether the MAC address of the user terminal is an odd MAC address or an even MAC address, and then, the control device may configure the first forwarding device as an active forwarding device and the second forwarding device as a standby forwarding device when the MAC address of the user terminal is an odd MAC address, and configure the second forwarding device as an active forwarding device and the first forwarding device as a standby forwarding device when the MAC address of user terminal is an even MAC address. Then, the control device stores a configuration result in the user entry information and delivers the user entry information to the first forwarding device and the second forwarding device, so that the first forwarding device and the second forwarding device each may perform a corresponding action based on the user entry information.

In a possible implementation, before the first forwarding device receives the packets of the user terminal forwarded in the load balancing mode, the method further includes: The first forwarding device receives a dial-up request broadcast by the user terminal. The first forwarding device obtains user entry information based on the dial-up request. The user entry information is used to indicate that the first forwarding device is the standby forwarding device corresponding to the user terminal.

For example, the first forwarding device and the second forwarding device each may be, for example, a broadband remote access server (BRAS). After receiving the dial-up request of the user terminal, the first forwarding device and the second forwarding device may obtain information about the user terminal in the procedure of identity authentication for the user terminal, and further directly determine the user entry information.

In a possible implementation, that the first forwarding device obtains user entry information based on the dial-up request includes: The first forwarding device generates the user entry information based on a MAC address of the user terminal corresponding to the dial-up request.

For example, if the first forwarding device is a BRAS, the first forwarding device may directly obtain the MAC address of the user terminal; determine whether the MAC address of the user terminal is an odd MAC address or an even MAC address; determine, based on preconfiguration, that the first forwarding device is the standby forwarding device corresponding to the user terminal; and complete creation of the user entry information.

In a possible implementation, the user entry information includes first indication information, second indication information, an IP address of the user terminal, and the MAC address of the user terminal. The first indication information is used to indicate that the first forwarding device is the standby forwarding device corresponding to the user terminal. The second indication information is used to indicate that the second forwarding device is the active forwarding device corresponding to the user terminal. The user entry information further includes any one or more of the following: routing information corresponding to the user terminal, QoS information of the user terminal, and access control list ACL information corresponding to the user terminal.

For example, after receiving the packets transmitted by the user terminal, the first forwarding device determines, based on the user entry information, whether the first forwarding device is an active forwarding device or a standby forwarding device of the user terminal that currently transmits the packets; and further determines whether the received packets need to be forwarded to the active forwarding device through the tunnel. For another example, if the routing information of the user terminal includes network addresses of the data packets transmitted by the user terminal, when the second forwarding device does not perform traffic statistics collection or QoS processing on the data packets, the first forwarding device directly forwards the received data packet to a corresponding internet based on the routing information.

In a possible implementation, the tunnel includes any one or more of the following: a direct interface link path, a label switched path LSP, a generic routing encapsulation GRE path, and a segment routing SRv6 path.

In this way, after receiving the packets, the standby forwarding device may forward the packets to the active forwarding device through a direct tunnel or a bypass tunnel between the standby forwarding device and the active forwarding device. For example, if the current network architecture is a leaf-spine network topology structure, and the first forwarding device and the second forwarding device serve as leaf devices, the first forwarding device may forward received packets to a spine device through, for example, the segment routing SRv6 path, and the spine device forwards the packets to the second forwarding device through, for example, the segment routing SRv6 path.

According to a second aspect, this application provides a packet transmission method. The method is applied to a network architecture including a user terminal, a first forwarding device, and a second forwarding device. A tunnel is disposed between the first forwarding device and the second forwarding device, and packets of the user terminal are forwarded to the first forwarding device and the second forwarding device in a load balancing mode. The method may include: The second forwarding device receives packets forwarded by the first forwarding device through the tunnel, where the packets forwarded through the tunnel include a keepalive packet. The second forwarding device is an active forwarding device corresponding to the user terminal, and the first forwarding device is a standby forwarding device corresponding to the user terminal. The second forwarding device updates a status of the user terminal based on the keepalive packet.

The status of the user terminal may include, for example, a status in a connection information table established by both communication parties. A "live status" of a peer end is confirmed based on the status. For example, preset duration is set, and if data transmitted by the user terminal is not received after the preset duration expires, it is determined that an exception occurs in a connection to the user terminal. After receiving the keepalive packet, the second forwarding device determines that the connection to the user terminal is normal, and may reset (update) a timer and start a next round of timing corresponding to the connection to the user terminal.

In a possible implementation, the packets of the user terminal further include data packets. The method further includes: If the second forwarding device is further configured to perform traffic statistics collection and quality of service QoS processing on the data packets, the second forwarding device receives a first data packet forwarded by the first forwarding device through the tunnel. The second forwarding device receives a second data packet of the user terminal. The second forwarding device forwards the first data packet and the second data packet to a destination device after performing traffic statistics collection and QoS processing based on the first data packet and the second data packet.

The destination device includes, for example, the internet or another external network device. In this way, the user terminal with a broadband service can access the internet through the second forwarding device.

In a possible implementation, the packets of the user terminal further include data packets. The method further includes: If the second forwarding device is not configured to perform traffic statistics collection and quality of service QoS processing on the data packets, the second forwarding device receives a second data packet of the user terminal. The second forwarding device directly forwards the second data packet to a destination device of the second data packet.

In a possible implementation, the network architecture further includes a control device. Before the second forwarding device receives the packets forwarded by the first forwarding device through the tunnel, the method further includes: The second forwarding device receives a dial-up request broadcast by the user terminal. The second forwarding device sends the dial-up request to the control device, and receives user entry information sent by the control device, where the user entry information is used to indicate that the second forwarding device is the active forwarding device corresponding to the user terminal.

In a possible implementation, the user entry information is determined by the control device based on a media access control MAC address of the user terminal or a quantity of sessions that are of the first forwarding device and the second forwarding device.

In a possible implementation, before the second forwarding device receives the packets forwarded by the first forwarding device through the tunnel, the method further includes: The second forwarding device receives a dial-up request broadcast by the user terminal. The second forwarding device obtains user entry information based on the dial-up request, where the user entry information is used to indicate that the second forwarding device is the active forwarding device corresponding to the user terminal.

In a possible implementation, that the second forwarding device obtains user entry information based on the dial-up request includes: The second forwarding device obtains the user entry information based on a MAC address of the user terminal corresponding to the dial-up request.

In a possible implementation, the user entry information includes first indication information, second indication information, an IP address of the user terminal, and the MAC address of the user terminal. The first indication information is used to indicate that the first forwarding device is the standby forwarding device corresponding to the user terminal. The second indication information is used to indicate that the second forwarding device is the active forwarding device corresponding to the user terminal. The user entry information further includes any one or more of the following: routing information corresponding to the user terminal, quality of service QoS information of the user terminal, and access control list ACL information corresponding to the user terminal.

In a possible implementation, the tunnel includes any one or more of the following: a direct interface link path, a label switched path LSP, a generic routing encapsulation GRE path, and a segment routing SRv6 path.

According to a third aspect, this application provides a packet transmission apparatus. The apparatus is used in a first forwarding device and may include a receiving unit and a sending unit. The receiving unit is configured to receive packets forwarded by a user terminal in a load balancing mode, where the packets include a keepalive packet, and the first forwarding device is a standby forwarding device corresponding to the user terminal. The sending unit is configured to forward the keepalive packet to a second forwarding device through a tunnel, where the second forwarding device is an active forwarding device corresponding to the user terminal.

In a possible implementation, the packets further include data packets. If the second forwarding device is further configured to perform traffic statistics collection and quality of service QoS processing on the data packets, the sending unit is further configured to forward a data packet to the second forwarding device through the tunnel.

In a possible implementation, the packets further include data packets. The sending unit is further configured to: if the second forwarding device is not configured to perform traffic statistics collection and quality of service QoS processing on the data packets, directly forward a data packet to a destination device of the data packet.

In a possible implementation, the receiving unit is further configured to: before receiving the packets forwarded by the user terminal in the load balancing mode, receive a dial-up request broadcast by the user terminal. The sending unit is further configured to send the dial-up request to a control device. The receiving unit is further configured to receive user entry information sent by the control device, where the user entry information is used to indicate that the first forwarding device is the standby forwarding device corresponding to the user terminal.

In a possible implementation, the user entry information is determined by the control device based on a media access control MAC address of the user terminal or a quantity of sessions that are of the first forwarding device and the second forwarding device.

In a possible implementation, the apparatus includes a processing unit. The receiving unit is further configured to: before receiving the packets of the user terminal forwarded in the load balancing mode, receive a dial-up request broadcast by the user terminal. The processing unit is configured to obtain user entry information based on the dial-up request, where the user entry information is used to indicate that the first forwarding device is the standby forwarding device corresponding to the user terminal.

In a possible implementation, the processing unit is specifically configured to generate the user entry information based on a MAC address of the user terminal corresponding to the dial-up request.

In a possible implementation, the user entry information includes first indication information, second indication information, an IP address of the user terminal, and the MAC address of the user terminal. The first indication information is used to indicate that the first forwarding device is the standby forwarding device corresponding to the user terminal. The second indication information is used to indicate that the second forwarding device is the active forwarding device corresponding to the user terminal. The user entry information further includes any one or more of the following: routing information corresponding to the user terminal, QoS information of the user terminal, and access control list ACL information corresponding to the user terminal.

In a possible implementation, the tunnel includes any one or more of the following: a direct interface link path, a label switched path LSP, a generic routing encapsulation GRE path, and a segment routing SRv6 path.

According to a fourth aspect, this application provides a packet transmission apparatus. The apparatus is used in a second forwarding device and includes a receiving unit and a processing unit. The receiving unit is configured to receive packets forwarded by a first forwarding device through a tunnel, where the packets include a keepalive packet, the second forwarding device is an active forwarding device corresponding to a user terminal, and the first forwarding device is a standby forwarding device corresponding to the user terminal. The processing unit is configured to update a status of the user terminal based on the keepalive packet.

In a possible implementation, packets of the user terminal include data packets. The apparatus further includes a sending unit. If the processing unit is further configured to perform traffic statistics collection and quality of service QoS processing on the data packets, the receiving unit is further configured to receive a first data packet forwarded by the first forwarding device through the tunnel. The receiving unit is further configured to receive a second data packet of the user terminal. The sending unit is configured to forward the first data packet and the second data packet to a destination device after the processing unit performs traffic statistics collection and QoS processing based on the first data packet and the second data packet.

In a possible implementation, packets of the user terminal include data packets. The apparatus further includes a sending unit. If the processing unit is not configured to perform traffic statistics collection and quality of service QoS processing on the data packets, the receiving unit is further configured to receive a second data packet of the user terminal. The sending unit is configured to directly forward the second data packet to a destination device of the second data packet.

In a possible implementation, the apparatus further includes the sending unit. The receiving unit is further configured to: before receiving the packets forwarded by the first forwarding device through the tunnel, receive a dial-up request broadcast by the user terminal. The sending unit is configured to send the dial-up request to a control device. The receiving unit is further configured to receive user entry information sent by the control device, where the user entry information is used to indicate that the second forwarding device is the active forwarding device corresponding to the user terminal.

In a possible implementation, the user entry information is determined by the control device based on a media access control MAC address of the user terminal or a quantity of sessions that are of the first forwarding device and the second forwarding device.

In a possible implementation, the receiving unit is configured to: before receiving the packets forwarded by the first forwarding device through the tunnel, receive a dial-up request broadcast by the user terminal. The processing unit is further configured to obtain user entry information based on the dial-up request, where the user entry information is used to indicate that the second forwarding device is the active forwarding device corresponding to the user terminal.

In a possible implementation, the processing unit is specifically configured to obtain the user entry information based on a MAC address of the user terminal corresponding to the dial-up request.

In a possible implementation, the user entry information includes first indication information, second indication information, an IP address of the user terminal, and the MAC address of the user terminal. The first indication information is used to indicate that the first forwarding device is the standby forwarding device corresponding to the user terminal. The second indication information is used to indicate that the second forwarding device is the active forwarding device corresponding to the user terminal. The user entry information further includes any one or more of the following: routing information corresponding to the user terminal, quality of service QoS information of the user terminal, and access control list ACL information corresponding to the user terminal.

In a possible implementation, the tunnel includes any one or more of the following: a direct interface link path, a label switched path LSP, a generic routing encapsulation GRE path, and a segment routing SRv6 path.

According to a fifth aspect, this application provides a packet transmission apparatus. The packet transmission apparatus may include one or more processors; and a memory, configured to store one or more computer programs, where the one or more computer programs include instructions. When the instructions are executed by the one or more processors, the packet transmission apparatus is enabled to perform the packet transmission method according to any one of the first aspect, the second aspect, or the possible implementations of the first aspect and the second aspect.

According to a sixth aspect, this application provides an apparatus. The apparatus has a function of implementing the packet transmission method according to any one of the first aspect, the second aspect, or the possible implementations of the first aspect and the second aspect. The function may be implemented by hardware, or may be implemented by hardware executing corresponding software. The hardware or the software includes one or more modules corresponding to the function.

According to a seventh aspect, an embodiment of this application provides a packet transmission system, including a user terminal, a first forwarding device, and a second forwarding device. A tunnel is disposed between the first forwarding device and the second forwarding device. Packets of the user terminal are forwarded to the first forwarding device and the second forwarding device in a load balancing mode. The first forwarding device performs the packet transmission method according to any one of the first aspect or the possible implementations of the first aspect. The second forwarding device performs the packet transmission method according to any one of the second aspect or the possible implementations of the second aspect.

According to an eighth aspect, this application provides a computer-readable storage medium, including computer instructions. When the computer instructions are run on a server, the server is enabled to perform the packet transmission method according to any one of the first aspect, the second aspect, or the possible implementations of the first aspect and the second aspect.

According to a ninth aspect, this application provides a computer program product. When the computer program product is run on a server, the server is enabled to perform the packet transmission method according to any one of the first aspect, the second aspect, or the possible implementations of the first aspect and the second aspect.

According to a tenth aspect, a circuit system is provided. The circuit system includes a processing circuit, and the processing circuit is configured to perform the packet transmission method according to any one of the first aspect, the second aspect, or the possible implementations of the first aspect and the second aspect.

DETAILED DESCRIPTION OF ILLUSTRATIVE EMBODIMENTS

The following describes in detail a packet transmission method, apparatus, and system provided in embodiments of this application with reference to accompanying drawings.

Figure 2A:
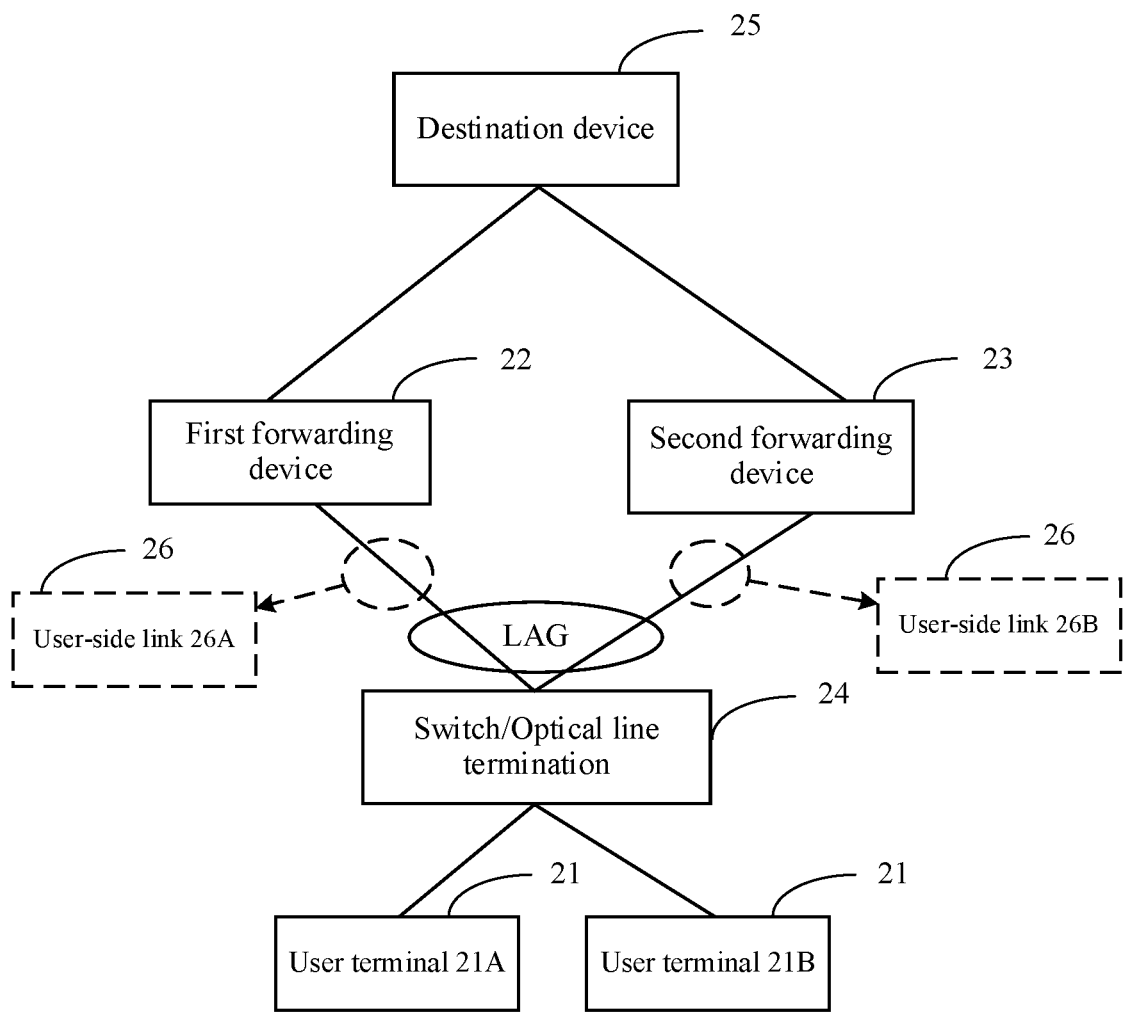
FIG. 2(a), FIG. 2(b), FIG. 2(c), and FIG. 2(d) are schematic diagrams of network architectures of a packet transmission system according to an embodiment of this application.

FIG. 2(a) is an example of a schematic diagram of a network architecture of a packet transmission system according to an embodiment of this application. The network architecture includes a plurality of user terminals 21 (for example, a user terminal 21A and a user terminal 21B), a first forwarding device 22, and a second forwarding device 23. The devices may be connected to each other through a wired network or a wireless network. A manner of connection between the devices is not specifically limited in this embodiment of this application.

The user terminal 21 may be a mobile phone, a tablet computer (pad), a computer with a wireless transceiver function, a personal digital assistant (PDA), a smartwatch, a netbook, a wearable electronic device, an augmented reality (AR) device, a virtual reality (VR) device, a vehicle-mounted device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, a terminal in artificial intelligence (AI), or another terminal device that can implement a network access function. A specific form of the user terminal is not specially limited in this embodiment of this disclosure.

Figure 1:
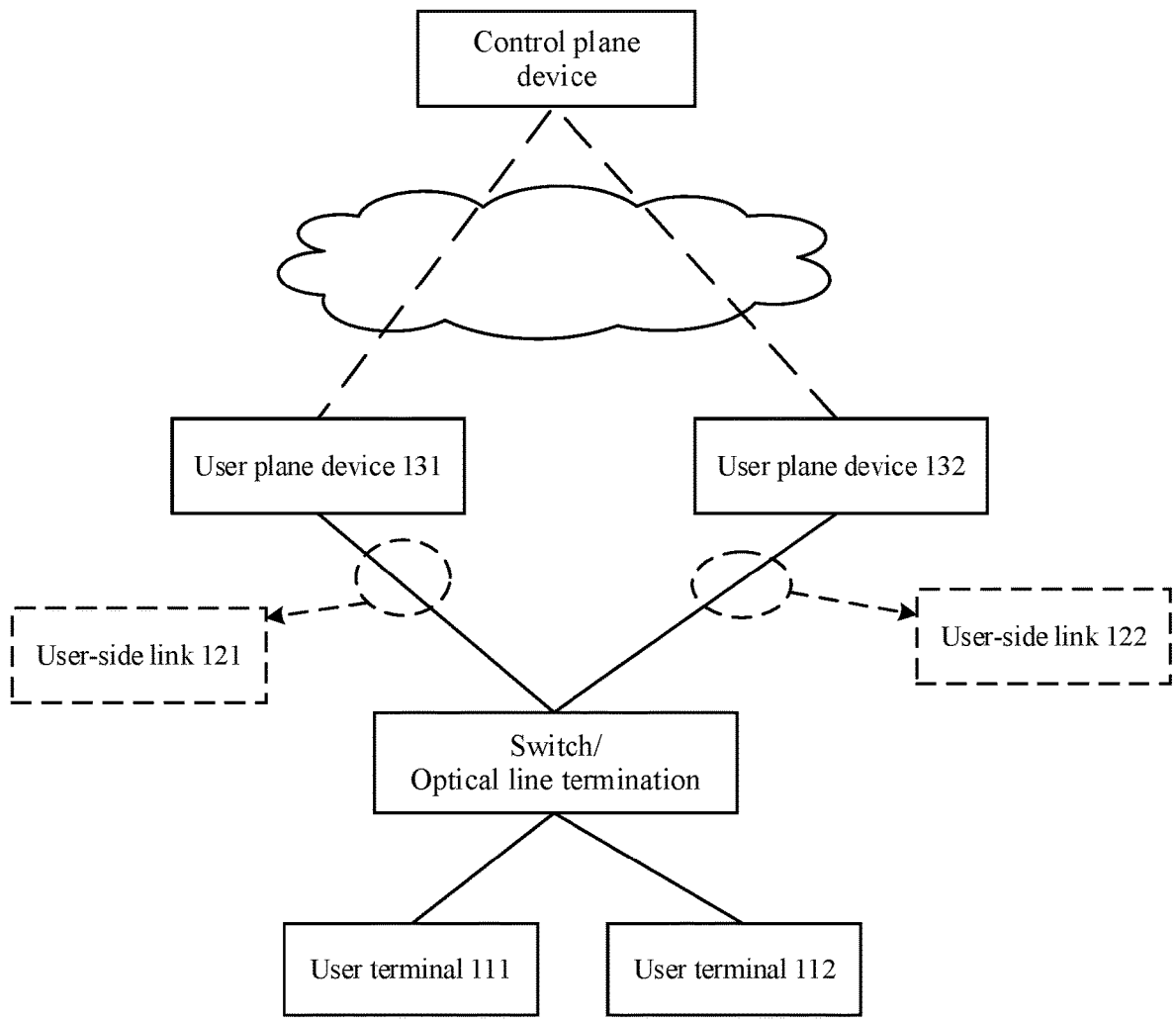
FIG. 1 is a schematic diagram of an application scenario of a packet transmission method in a conventional technology according to an embodiment of this application.

The first forwarding device 22 and the second forwarding device 23 each may be, for example, a broadband remote access server (BRAS). Alternatively, as shown in FIG. 1, BNG devices are used in a network architecture based on SDN and NFV, to implement decoupling of the BNG devices. In this case, the first forwarding device 22 and the second forwarding device 23 may be BNG user plane (BNG-UP) devices. The first forwarding device 22 and the second forwarding device 23 are located at an edge of a network layer, serve as a bridge between a broadband access network and a backbone network, and provide a basic access means and a management function of the broadband access network. The first forwarding device 22 and the second forwarding device 23 converge and forward a plurality of services, meet requirements of different users for transmission capacity and bandwidth utilization, and are core devices for broadband user access. For example, after receiving packets transmitted by the user terminal 21 through a layer-2 device such as an SW/OLT 24, the first forwarding device 22 may forward the packets to a destination device 25 corresponding to the packets. The destination device 25 may include, for example, the internet or another external network device. In this way, for example, the user terminal 21 with a broadband service can access the internet through the first forwarding device 22. The first forwarding device 22 and the second forwarding device 23 may further receive packets transmitted by the destination device 25, and forward the packets to the user terminal 21.

Optionally, before the user terminal 21 normally accesses the network, identity authentication needs to be performed for the user terminal 21. In this case, the network architecture may further include an authentication, authorization, and accounting (AAA) server. The AAA server is a server capable of processing an access request of the user terminal 21, and provides authentication, authorization, and account services. The AAA server is mainly configured to manage the user terminal to access a network server, and provide services for the user terminal 21 that has an access right.

Figure 2B:
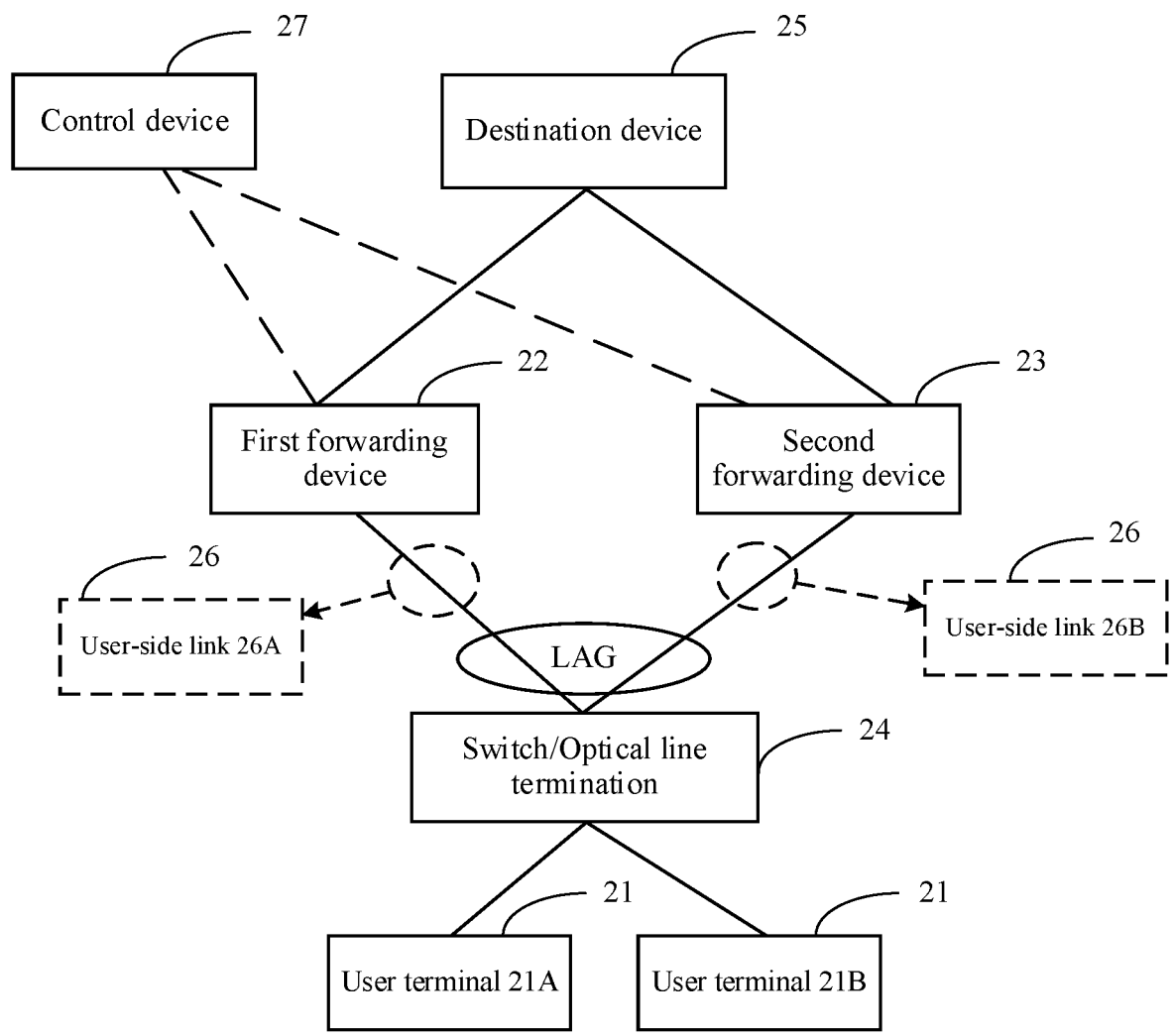

Optionally, as shown in FIG. 2(b), if the first forwarding device 22 and the second forwarding device 23 are BNG user plane (BNG-UP) devices, the network architecture may further include a control device 27, for example, a BNG control plane (BNG-CP) device. The control device 27 is configured to collaborate with an authentication system, a charging system, a customer management system, a service policy control system, and the AAA server, to implement authentication, charging, and management functions for access of the user terminal 21. Alternatively, as shown in FIG. 2(a), if the first forwarding device 22 and the second forwarding device 23 each are a BRAS device, the first forwarding device 22 and the second forwarding device 23 are directly configured to collaborate with an authentication system, a charging system, and a customer management system, a service policy control system and the AAA server, to implement the authentication, accounting, and management functions for access of the user terminal 21.

Figure 3:
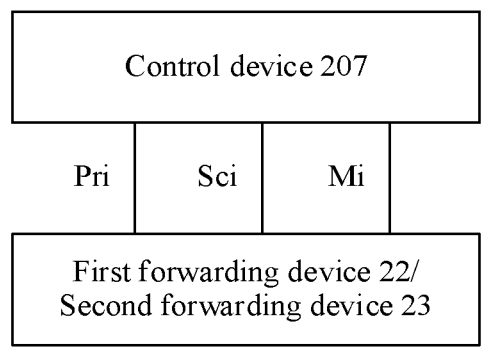
FIG. 3 is a schematic diagram of an interface between a control device and a forwarding device according to an embodiment of this application.

Optionally, FIG. 3 is a schematic diagram of an interface between a control device and a first forwarding device/a second forwarding device. Communication between the control device and the first forwarding device/the second forwarding device is implemented through a control packet redirect interface (CPRI), a state control interface (SCI), and a management interface (MI). For functions of the interfaces in the embodiments of this application, refer to related descriptions of a procedure of identity authentication for a user terminal in FIG. 4A and FIG. 4B, and FIG. 5A and FIG. 5B.

It should be noted that the foregoing network architecture may be a conventional layer-3 network topology structure, or may be a leaf-spine network topology structure. For example, the first forwarding device 22 and the second forwarding device 23 serve as leaf devices, and another forwarding device may be configured as a spine device between the first forwarding device 22 and the second forwarding device 23, and the destination device 25. Alternatively, with development of network technologies, another type of network topology structure may be used.

The following way may be used to improve utilization of user-side links 26 (for example, a user-side link 26A and a user-side link 26B shown in FIG. 2(a)) between the SW/OLT 24 and the first forwarding device 22 and between the SW/OLT 24 and the second forwarding device 23, and avoid a problem that load on a single-side link is relatively heavy. A plurality of physical layer-2 user-side links 26 may be bundled into one logical layer-2 link by using a link aggregation group (LAG) technology. The plurality of user-side links 26 in an LAG correspond to a same trunk port and are connected to the SW/OLT 24, and the plurality of user-side links 26 corresponding to the trunk port may implement load balancing. In this way, as shown in FIG. 2(a) or FIG. 2(b), after the uplink packets transmitted by the user terminal 21 pass through the SW/OLT 24, the uplink packets are transmitted to the first forwarding device 22 and the second forwarding device 23 over the user-side link 26A and the user-side link 26B, to implement load balancing between the user-side links 26.

Currently, in an existing network architecture, a service connected to the SW/OLT 24 may be a private line service, for example, a layer-2 virtual private network (L2VPN) service or a layer-3 virtual private network (L3VPN) service. The service may be alternatively a broadband service. After the user-side links 26 are aggregated by using the LAG technology, the user terminal 21 with the L2VPN, the L3VPN, or the broadband service may be distinguished through sub-interfaces of the trunk interface, so that the user terminal 21 has different ranges of virtual local area network (VLAN).

For an L2VPN user and an L3VPN user, after the packets of the user terminal 21 are forwarded to the first forwarding device 22 and the second forwarding device 23 in a load balancing mode (for example, by using the LAG technology) at the SW/OLT 24 through configuration, the first forwarding device 22 and the second forwarding device 23 may directly forward obtained packets to the destination device 25, so that dual-active access of the two user-side links 26 can be implemented. For a broadband service user, a route corresponding to the user terminal 21 with the broadband service can be configured on only a single forwarding device. That is, after the user terminal 21 with the broadband service aggregates, by using the LAG technology, the user-side link 26 corresponding to the first forwarding device 22 and the user-side link 26 corresponding to the second forwarding device 23, the route corresponding to the user terminal 21 can be configured on only one of the forwarding devices. The one forwarding device is an active forwarding device corresponding to the user terminal 21, and the other forwarding device on which no route corresponding to the user terminal 21 is configured is a standby forwarding device corresponding to the user terminal 21. If the user terminal 21 with the broadband service forwards packets to the standby forwarding device in the load balancing mode at the SW/OLT 24, because the route corresponding to the user terminal 21 is not configured on the standby forwarding device, the standby forwarding device cannot process the packets, and even directly discards the corresponding packets. As a result, the user terminal goes offline due to a failure.

Figure 2C:
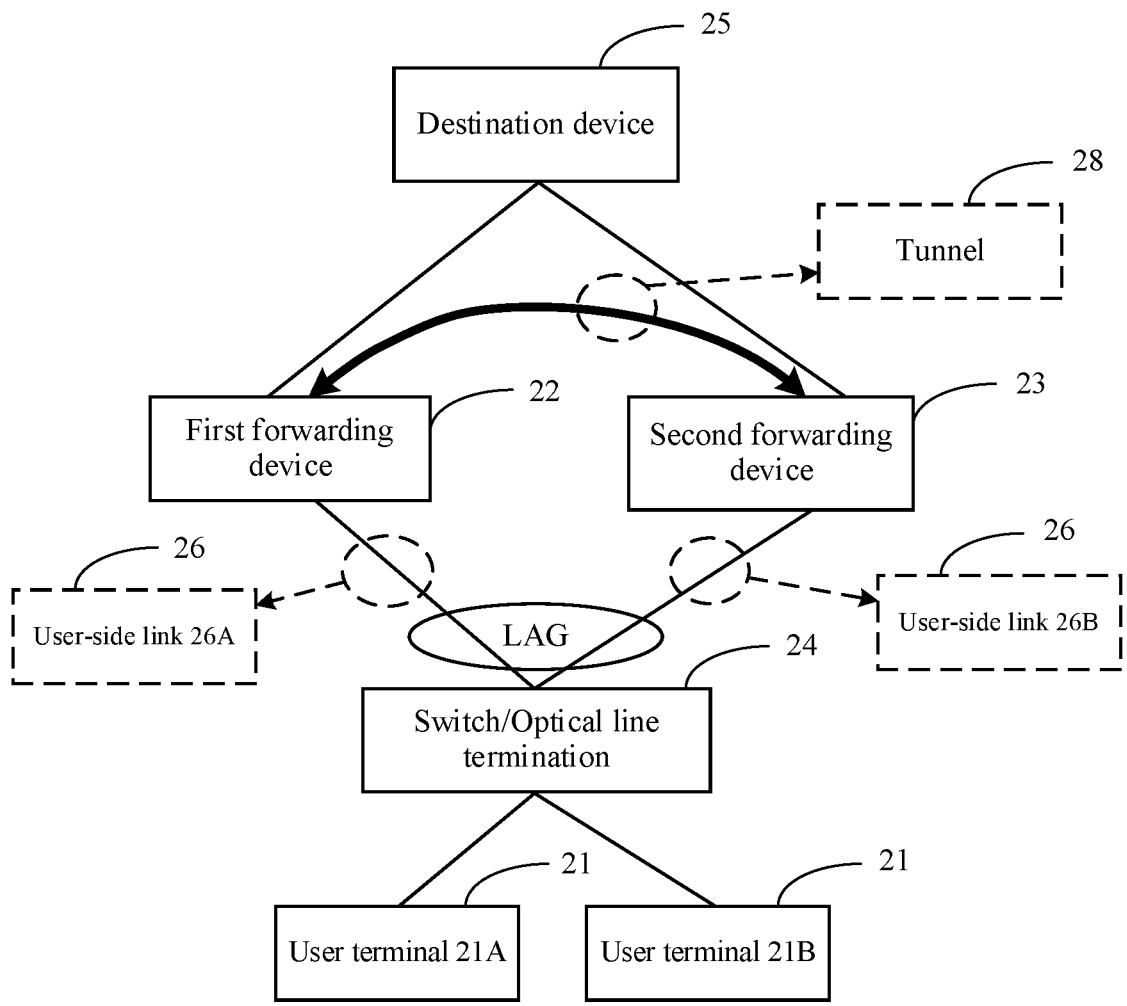
Figure 2D:
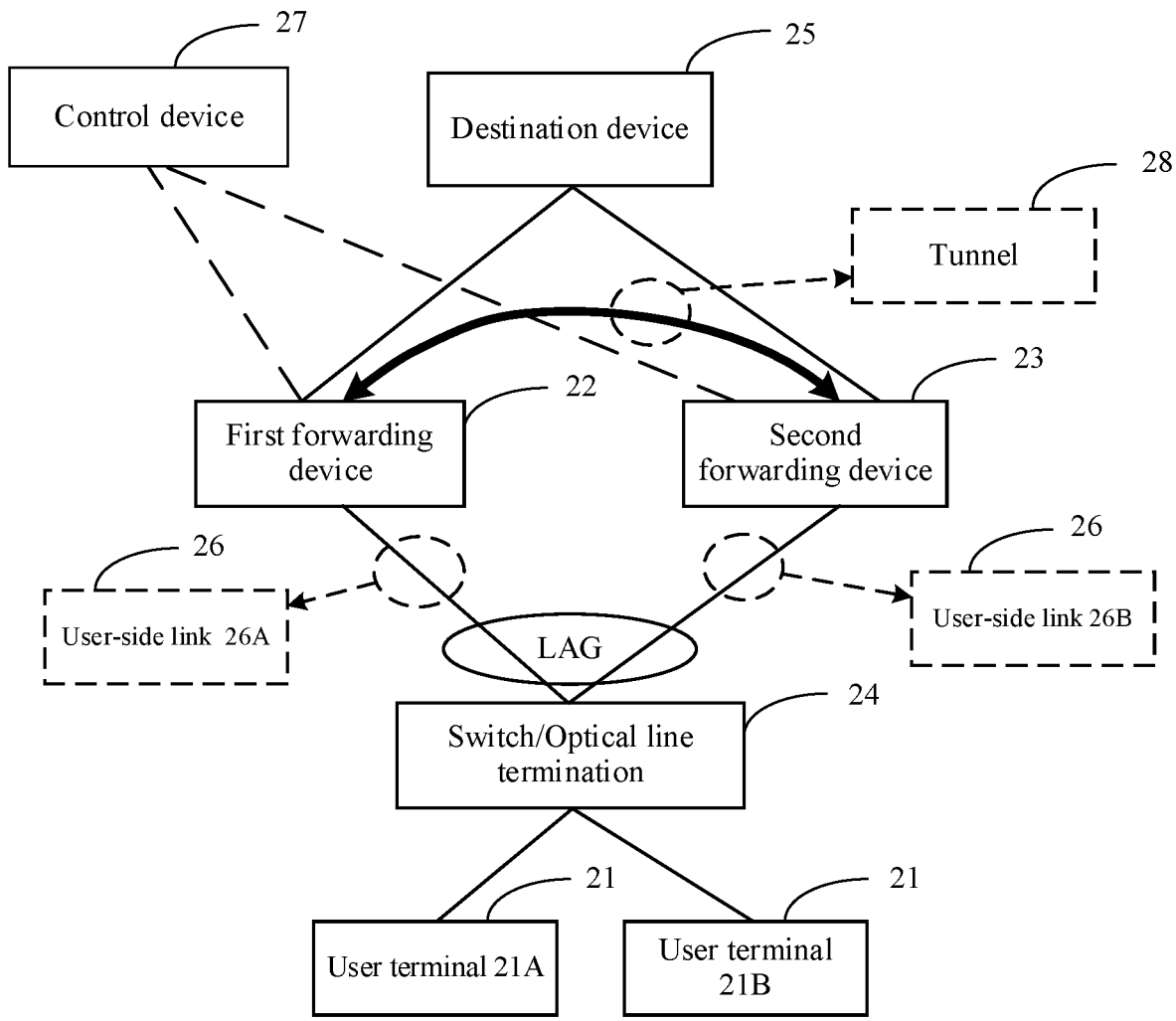

In view of this, this embodiment of this application provides a packet transmission method, applied to a network architecture shown in FIG. 2(c) or FIG. 2(d). FIG. 2(c) is an improvement of the network architecture shown in FIG. 2(a), and FIG. 2(d) is an improvement of the network architecture shown in FIG. 2(b). As shown in FIG. 2(c) or FIG. 2(d), a tunnel 28 is configured between the first forwarding device 22 and the second forwarding device 23. In this way, if the standby forwarding device receives the packets forwarded by the user terminal 21, and determines that the standby forwarding device is a standby forwarding device on which no route corresponding to the user terminal 21 is configured, the standby forwarding device may forward the packets to the active forwarding device through the tunnel 28, to avoid the case in which the user terminal goes offline due to the failure. According to the packet transmission method provided in this embodiment of this application, it can be ensured that the user terminal with the broadband service normally transmits packets on a premise that the packets can be transmitted over user-side links in the load balancing mode.

Figure 4A:
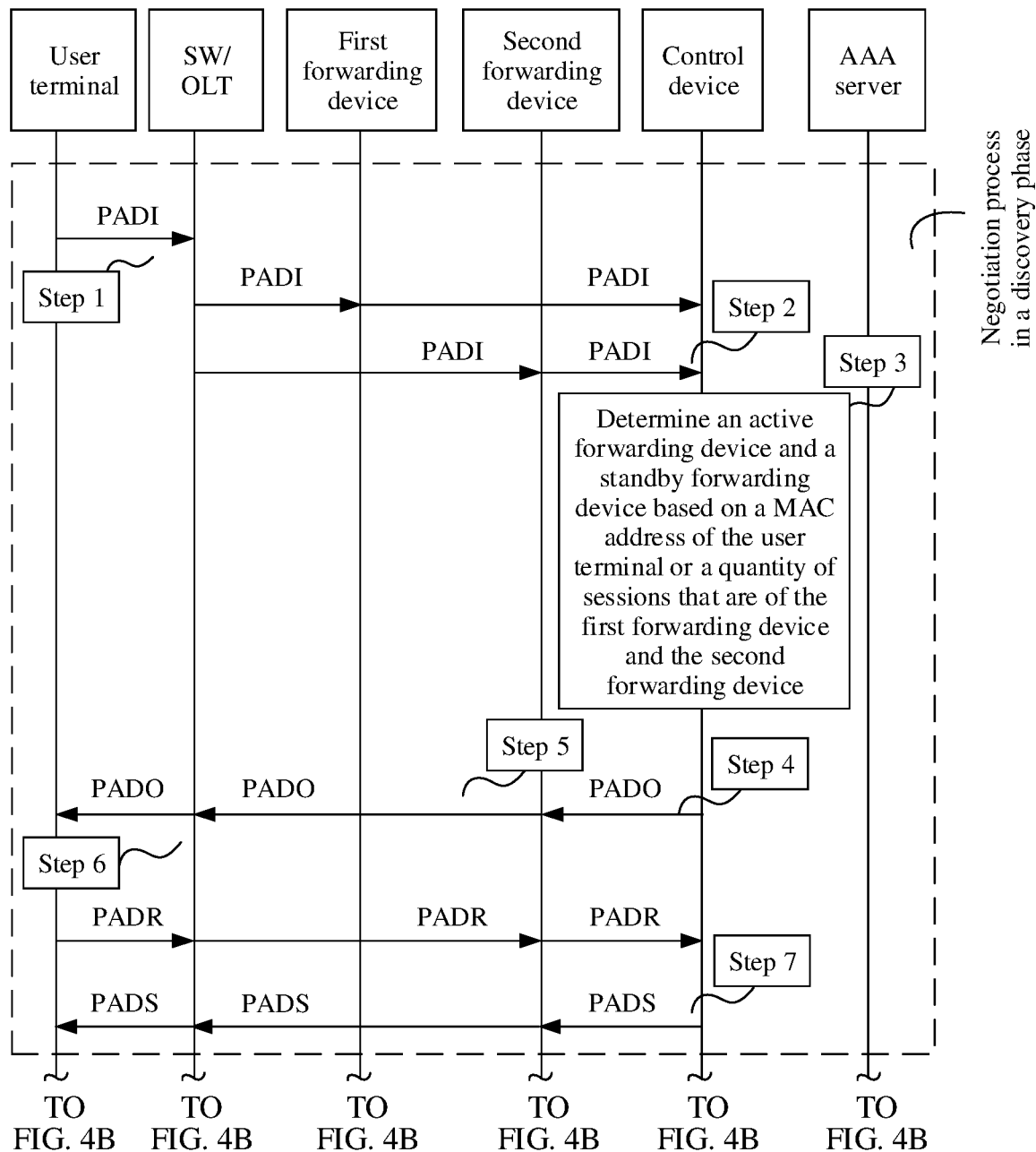
FIG. 4A and FIG. 4B are a schematic diagram 1 of a procedure of identity authentication for a user terminal according to an embodiment of this application.
Figure 4B:
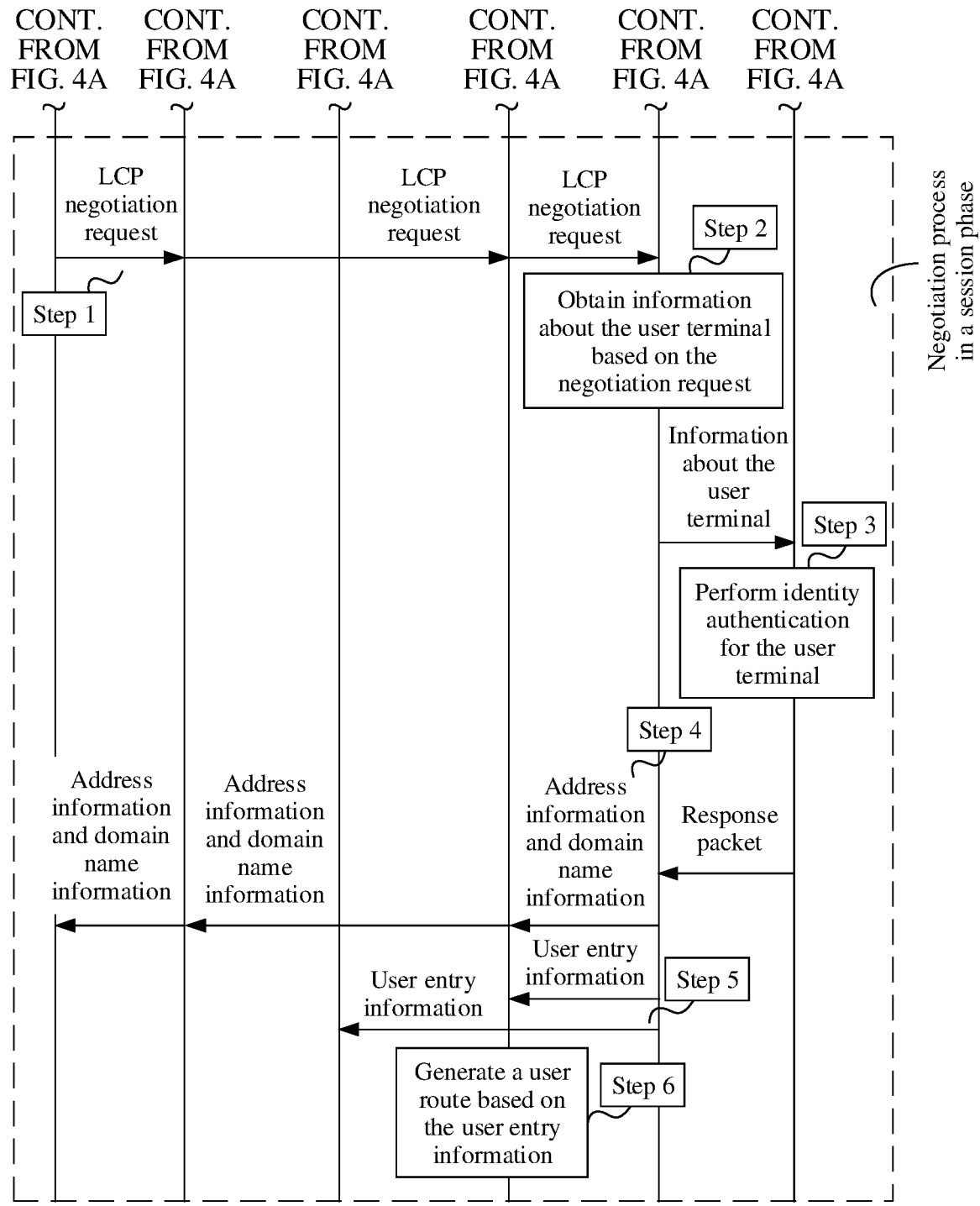

The procedure of identity authentication for the user terminal is first briefly described. FIG. 4A and FIG. 4B are a schematic diagram of a procedure of identity authentication for a user terminal. The procedure of identity authentication for the user terminal may be applied to the network architecture shown in FIG. 2(d).

For example, the user terminal accesses a network according to a point-to-point protocol over Ethernet (PPPOE) protocol, and the procedure of identity authentication may include a negotiation process in a discovery phase and a negotiation process in a session phase.

The negotiation process in the discovery phase includes:

Step 1: The user terminal sends a pppoe dial-up request. For example, the user terminal sends pppoe active discovery initiation (PADI) packets to a first forwarding device and a second forwarding device through an SW/OLT.

Step 2: The first forwarding device and the second forwarding device forward the PADI packets to a control device through a CPRI.

Step 3: The control device may determine an active forwarding device and a standby forwarding device based on a MAC address of the user terminal corresponding to the PADI packets or a quantity of sessions (or referred to as an amount of session load) that are of the first forwarding device and the second forwarding device. For example, the first forwarding device is an active forwarding device corresponding to a user terminal with an odd MAC address, and the second forwarding device is a standby forwarding device corresponding to a user terminal with an even MAC address. For another example, if the quantity of sessions of the second forwarding device is relatively small, and the user terminal may be accessed through the second forwarding device, the second forwarding device is an active forwarding device corresponding to the user terminal, and the first forwarding device is a standby forwarding device corresponding to the user terminal.

Step 4: The control device replies to the active forwarding device with a pppoe active discovery offer (PADO) packet, where the PADO packet indicates that a connection to the user terminal is allowed to be established. Assuming that the control device determines that the second forwarding device is the active forwarding device corresponding to the user terminal, the control device replies to the second forwarding device with the PADO packet.

Step 5: The second forwarding device forwards the PADO packet to the user terminal through the SW/OLT.

Step 6: After receiving the PADO packet, the user terminal sends a pppoe active discovery request (PADR) packet to the control device through the SW/OLT and the second forwarding device.

Step 7: After receiving the PADR packet, the control device sends a pppoe active session-confirmation (PADS) packet to the user terminal through the second forwarding device and the SW/OLT, to complete the negotiation process in the discovery phase for the pppoe dial-up request.

The negotiation process in the session phase includes the following.

Step 1: The user terminal sends a link control protocol (LCP) negotiation request to the control device through the SW/OLT and the second forwarding device, where the LCP negotiation request carries information about the user terminal (for example, a user name and a password of the user terminal), and the LCP negotiation request is used to request to perform identity authentication for the user terminal.

Step 2: The control device obtains the information about the user terminal based on the LCP negotiation request, and sends the information about the user terminal to an AAA server.

Step 3: The AAA server performs matching between stored information about the user terminal and the received information about the user terminal to perform identity authentication for the user terminal, and the AAA server sends a response packet to the control device after authentication succeeds (to be specific, the stored information about the user terminal is the same as the received information about the user terminal).

Step 4: After receiving the response packet, the control device allows the user terminal to access the network, indicates the AAA server to start accounting, and sends, to the second forwarding device through an Mi, address information and domain name information that are allocated to the user terminal. The second forwarding device delivers the address information and the domain name information to the user terminal.

Step 5: The control device generates user entry information and delivers the user entry information to the first forwarding device and the second forwarding device through an Sci.

Step 6: The second forwarding device generates a user route based on the user entry information, and advertises the user route information to other devices, so that the user terminal may access the network through the second forwarding device subsequently.

The user entry information includes first indication information, second indication information, an IP address of the user terminal, and a MAC address of the user terminal. The first indication information is used to indicate that the first forwarding device is the standby forwarding device corresponding to the user terminal. The second indication information is used to indicate that the second forwarding device is the active forwarding device corresponding to the user terminal. The user entry information further includes any one or more of the following: routing information corresponding to the user terminal, QoS information of the user terminal, and access control list (ACL) information corresponding to the user terminal. The following Table 1 lists examples of content and meanings of the content included in the user entry information. In the ACL information corresponding to the user terminal in the user entry information, a name of an ACL template corresponding to the user terminal is displayed.

TABLE 1

User entry information

| | | |
|---|---|---|
| 1 | First indication information | Active forwarding device |
| 2 | Second indication information | Standby forwarding device |
| 3 | IP address of a user terminal | 111.132.222.180 |
| 4 | MAC address of the user terminal | 07-16-77-01-02-68 |
| 5 | Routing information corresponding to the user terminal | <router-link to="/home"> </router-link> |
| 6 | QoS information of the user terminal | Minimum guaranteed bandwidth: 365 Mbps |
| 7 | ACL information corresponding to the user terminal | Name |

Figure 5A:
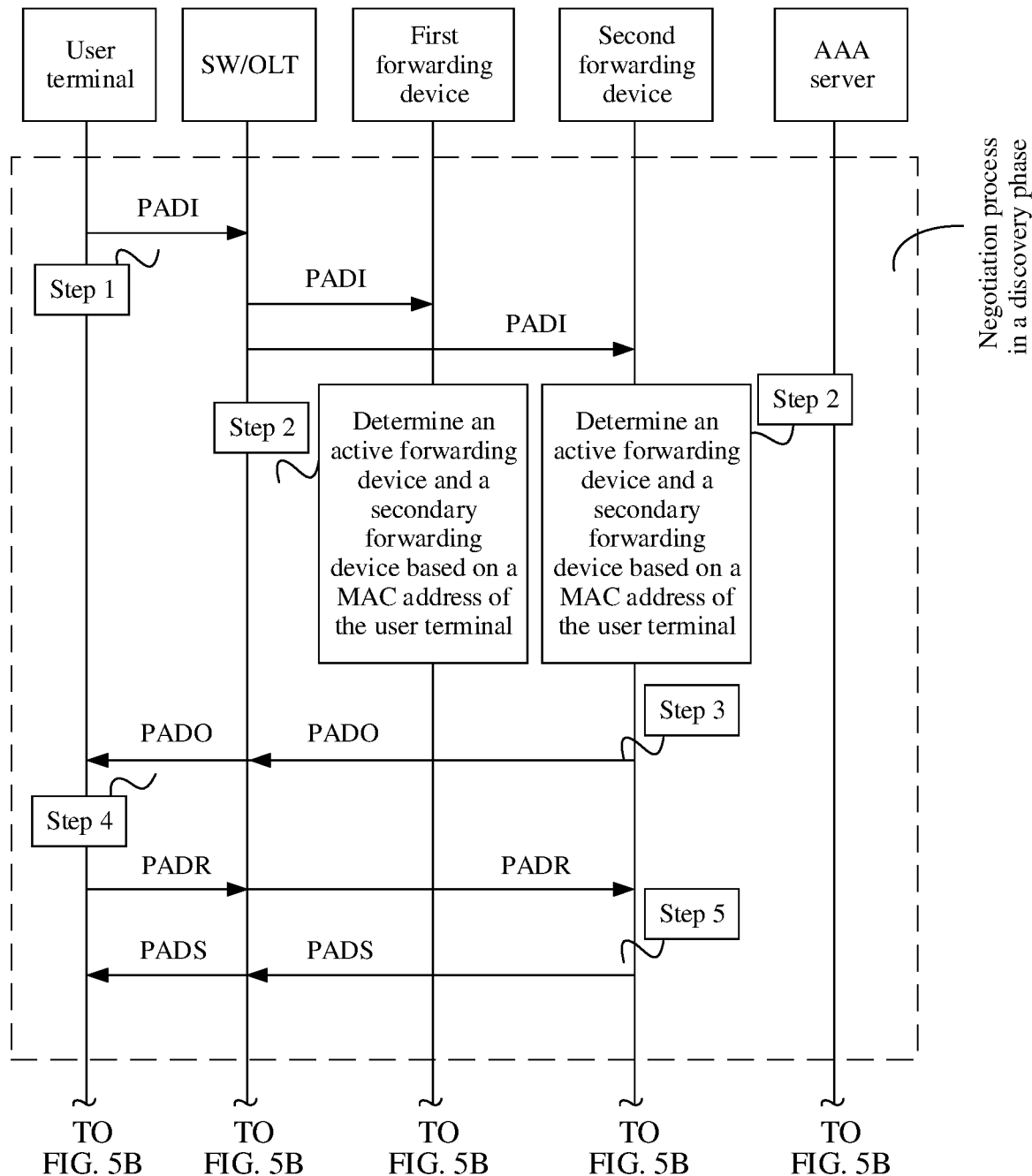
FIG. 5A and FIG. 5B are a schematic diagram 2 of a procedure of identity authentication for a user terminal according to an embodiment of this application.
Figure 5B:
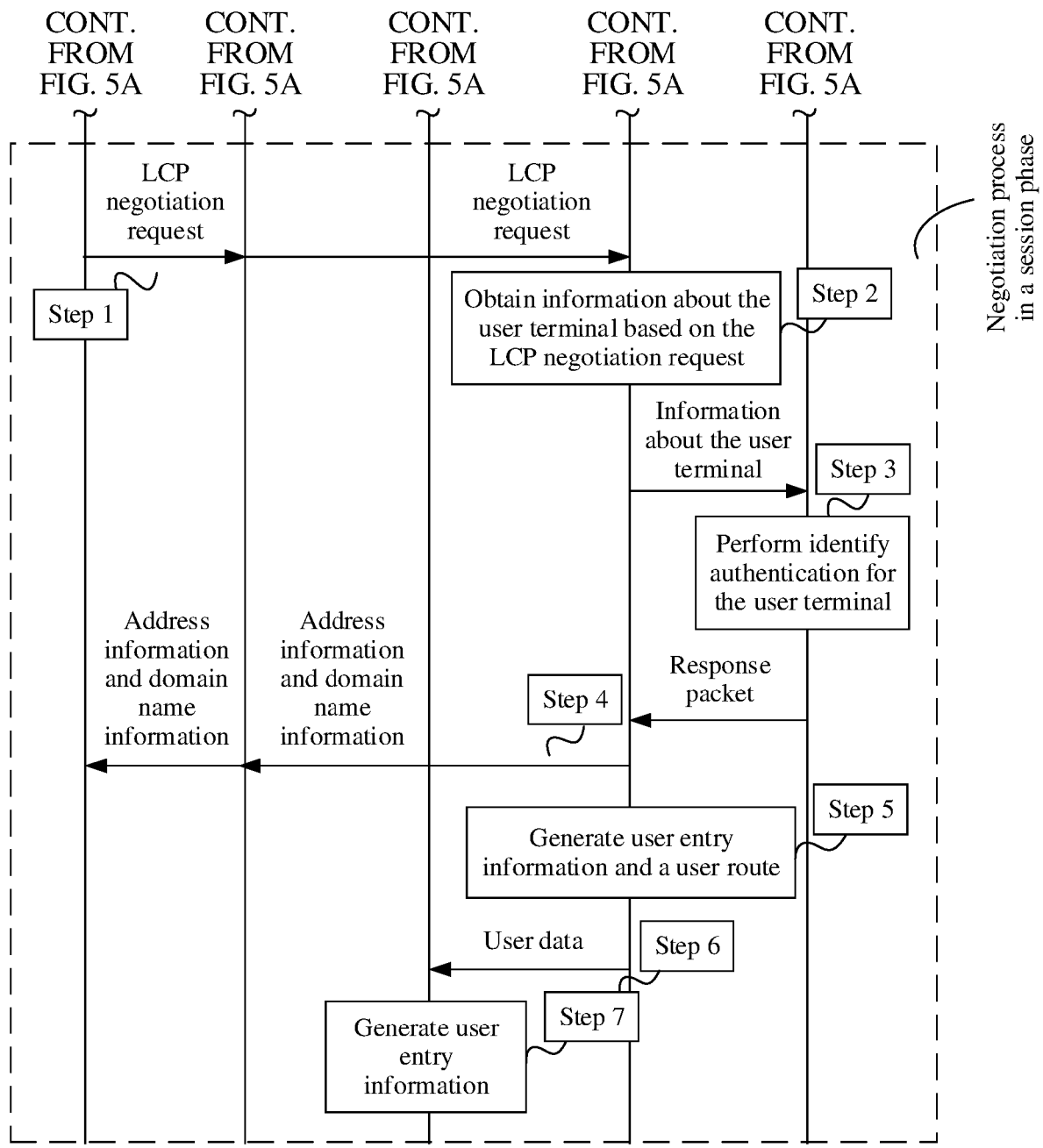

For example, FIG. 5A and FIG. 5B are a schematic diagram of another procedure of identity authentication for a user terminal. The procedure of the identity authentication for the user terminal may be applied to the network architecture shown in FIG. 2(*c*). In this case, the first forwarding device and the second forwarding device may perform interaction actions between a control device and an AAA server.

Refer to FIG. 5A. A negotiation process in a discovery phase includes the following steps.

Step 1: A user terminal sends a pppoe dial-up request. For example, the user terminal sends PADI packets to a first forwarding device and a second forwarding device through an SW/OLT.

Step 2: After receiving the PADI packets, the first forwarding device and the second forwarding device directly determine an active forwarding device and a secondary forwarding device based on a MAC address of the user terminal corresponding to the PADI packets. Assuming that it is determined that the second forwarding device is an active forwarding device corresponding to the user terminal, the second forwarding device replies to the user terminal with a PADO packet.

Step 3: The second forwarding device forwards the PADO packet to the user terminal through the SW/OLT.

Step 4: After receiving the PADO packet, the user terminal sends a PADR packet to the second forwarding device through the SW/OLT.

Step 5: After receiving the PADR packet, the second forwarding device sends a PADS packet to the user terminal through the SW/OLT, to complete the negotiation process in the discovery phase for the pppoe dial-up request.

A negotiation process in a session phase includes the following.

Step 1: The user terminal sends an LCP negotiation request to the second forwarding device through the SW/OLT.

Step 2: The second forwarding device obtains information about the user terminal based on the LCP negotiation request, and sends the information about the user terminal to the AAA server.

Step 3: The AAA server performs identify authentication for the user terminal, and the AAA server sends a response packet to the second forwarding device after authentication succeeds.

Step 4: After receiving the response packet, the second forwarding device allows the user terminal to access a network, indicates the AAA server to start accounting, and sends, to the user terminal through the SW/OLT, address information and domain name information that are allocated to the user terminal.

Step 5: The second forwarding device generates user entry information and a user route.

Step 6: The active forwarding device sends user data to the standby forwarding device, and indicates the standby forwarding device to synchronize user data. In other words, the second forwarding device sends the user data to the first forwarding device.

Step 7: The first forwarding device synchronizes the user data, and generates corresponding user entry information.

Subsequently, the user terminal can access the network normally.

Figure 6:
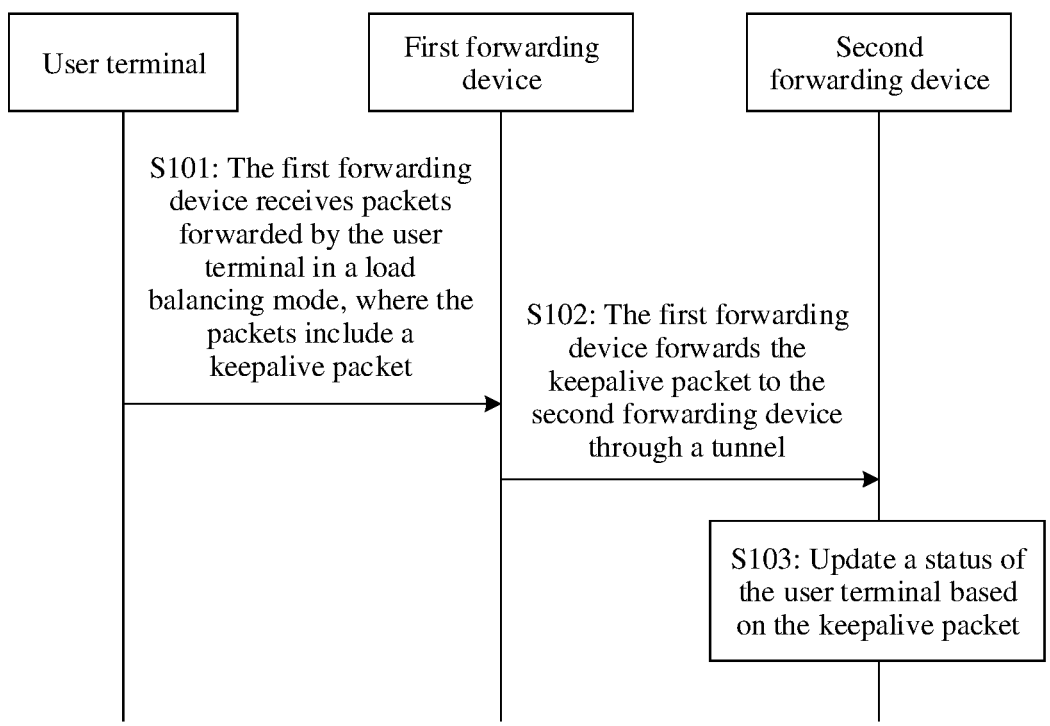
FIG. 6 is a schematic flowchart 1 of a packet transmission method according to an embodiment of this application.

FIG. 6 is a schematic flowchart of a packet transmission method according to an embodiment of this application performed after identity authentication for the user terminal succeeds. The method may include S101 to S103.

S101: A first forwarding device receives packets forwarded by a user terminal in a load balancing mode, where the packets include a keepalive packet.

The packets of the user terminal may include a signaling packet, for example, a keepalive (keepalive) packet. In a process of establishing a connection between the user terminal and the forwarding device and performing communication, the two communication parties may encounter various exceptions such as power-off, breakdown, and unexpected restart. After an exception occurs, if the two parties do not release the connection in a timely manner, one communication party keeps maintaining the connection when the party does not know a status of the peer communication party. As a result, system resources of the peer end are wasted as abnormal connections accumulate. Therefore, the keepalive packet may be used to detect a "live" status of the peer end of the connection.

For example, as shown in FIG. 2(*d*), the user-side link 26 between the SW/OLT 24 and the first forwarding device 22 and the user-side link 26 between the SW/OLT 24 and the second forwarding device 23 are aggregated into one logical link by using the LAG technology, to implement load balancing between the user-side links 26. After identity authentication is performed for the user terminal 21 by using the control device 27 and the AAA server, and it is determined that the first forwarding device 22 is the standby forwarding device corresponding to the user terminal 21, and the second forwarding device 23 is the active forwarding device corresponding to the user terminal 21, the packets of the user terminal 21 are forwarded to the first forwarding device 22 and the second forwarding device 23 in the load balancing mode at the SW/OLT 24. When the packets pass through the SW/OLT 24, the SW/OLT 24 performs a load balancing operation, for example, a hash (hash) operation. Then, the packets are forwarded to the first forwarding device 22 and the second forwarding device 23 based on a result of the load balancing operation.

For another example, as shown in FIG. 2(*c*), the first forwarding device 22 and the second forwarding device 23 determine that the first forwarding device 22 is the standby forwarding device corresponding to the user terminal 21, and the second forwarding device 23 is the active forwarding device corresponding to the user terminal 21. After identity authentication is performed for the user terminal 21 by using the second forwarding device 23 and the AAA server, the packets of the user terminal 21 are forwarded to the first forwarding device 22 and the second forwarding device 23 in the load balancing mode at the SW/OLT 24. When the packets pass through the SW/OLT 24, the SW/OLT 24 performs a load balancing operation, for example, a hash (hash) operation. Then, the packets are forwarded to the first forwarding device 22 and the second forwarding device 23 based on a result of the load balancing operation.

In this way, load balancing is implemented between a plurality of user-side links, and the first forwarding device and the second forwarding device receive packets that are forwarded based on the result of the load balancing operation.

S102: The first forwarding device forwards the keepalive packet to a second forwarding device through a tunnel.

The tunnel includes any one or more of the following: a direct interface link path, a label switched path (LSP), a generic routing encapsulation (GRE) path, and an IP protocol segment routing version 6 (SRv6) path. For example, if the tunnel is the direct interface link path, it indicates that a direct path is established between the first forwarding device and the second forwarding device, and packets may be directly transmitted. For another example, a bypass tunnel is established between the first forwarding device and the second forwarding device by using a forwarding technology such as SRv6, and packets are forwarded by an intermediate device such as a spine device.

For example, after the packets are transmitted to the first forwarding device based on the result of the load balancing operation, the first forwarding device queries user entry information, and determines, based on the user entry information, an identifier of a user terminal corresponding to the received packets. Further, it is determined, based on the identifier of the user terminal, that the first forwarding device is a standby forwarding device of the user terminal corresponding to the packets. For example, a flag may be set in the packet. After receiving the packet, the first forwarding device determines corresponding indication information based on a value of the flag, and further determines an active/standby status, indicated by the indication information, of the forwarding device for the user terminal. For example, if the value of the flag corresponds to first indication information, it indicates that the first forwarding device is the standby forwarding device of the user terminal. The standby forwarding device is not configured to reply to the keepalive packet. In this case, the first forwarding device forwards the received keepalive packet to the second forwarding device through the tunnel between the first forwarding device and the second forwarding device, and the second forwarding device processes the keepalive packet.

For example, as shown in FIG. 2(*d*), after receiving the packets of the user terminal 21 transmitted by the SW/OLT 24 in the load balancing mode, the first forwarding device 22 determines, based on the user entry information, that the packets do not need to be processed. Instead, the first forwarding device 22 forwards the packets to the second forwarding device 23 through the tunnel 28.

S103: The second forwarding device updates a status of the user terminal based on the keepalive packet.

The status of the user terminal may include, for example, whether the user terminal is normally connected, a value of a keep-alive timer, and the like. Specifically, a connection information table may generally be established by the two communication parties to store a communication status of a peer device, and the keepalive timer may be set. After receiving the keepalive packet, the second forwarding device confirms that the user terminal is online, resets the keepalive request timer, and updates the status of the user terminal to restart timing. Therefore, it is avoided that the second forwarding device deletes information about the user terminal from the connection information table when information transmitted by the user terminal is not received after preset duration expires. Correspondingly, after receiving an acknowledgment response packet of the keepalive packet, the user terminal also updates a status of the second forwarding device to ensure a normal connection. It may be understood that the second forwarding device may alternatively actively send the keepalive packet to the user terminal, to confirm the status of the user terminal.

For example, after receiving the keepalive packet forwarded by the first forwarding device through the tunnel, the second forwarding device updates the status of the user terminal, and sends the acknowledgment (ACK) response packet of the keepalive packet to the user terminal based on a user route obtained in a process of identity authentication for the user terminal. In other words, even if a route corresponding to the user terminal with a broadband service can be configured on only a single forwarding device, after the packets are transmitted to the standby forwarding device in the load balancing mode, the standby forwarding device can still forward the packets to the active forwarding device through the tunnel, and the active forwarding device processes the packets based on the user route. This ensures that the user terminal can normally access the network.

For example, as shown in FIG. 2(*d*), after receiving the keepalive packet forwarded by the first forwarding device 22 through the tunnel 28, the second forwarding device 23 updates the status of the corresponding user terminal 21 based on the keepalive packet, restarts a keepalive timer, and sends an acknowledgement response packet of the keepalive request packet to the user terminal 21, to confirm that the connection between the two parties is normal.

Therefore, according to the packet transmission method provided in this embodiment of this application, the tunnel is established between the first forwarding device and the second forwarding device, and it can be ensured that the user terminal can perform normal access when the packets of the user terminal are transmitted in the load balancing mode. This can improve utilization of the user-side link and reduce load on the user-side link.

Figure 7:
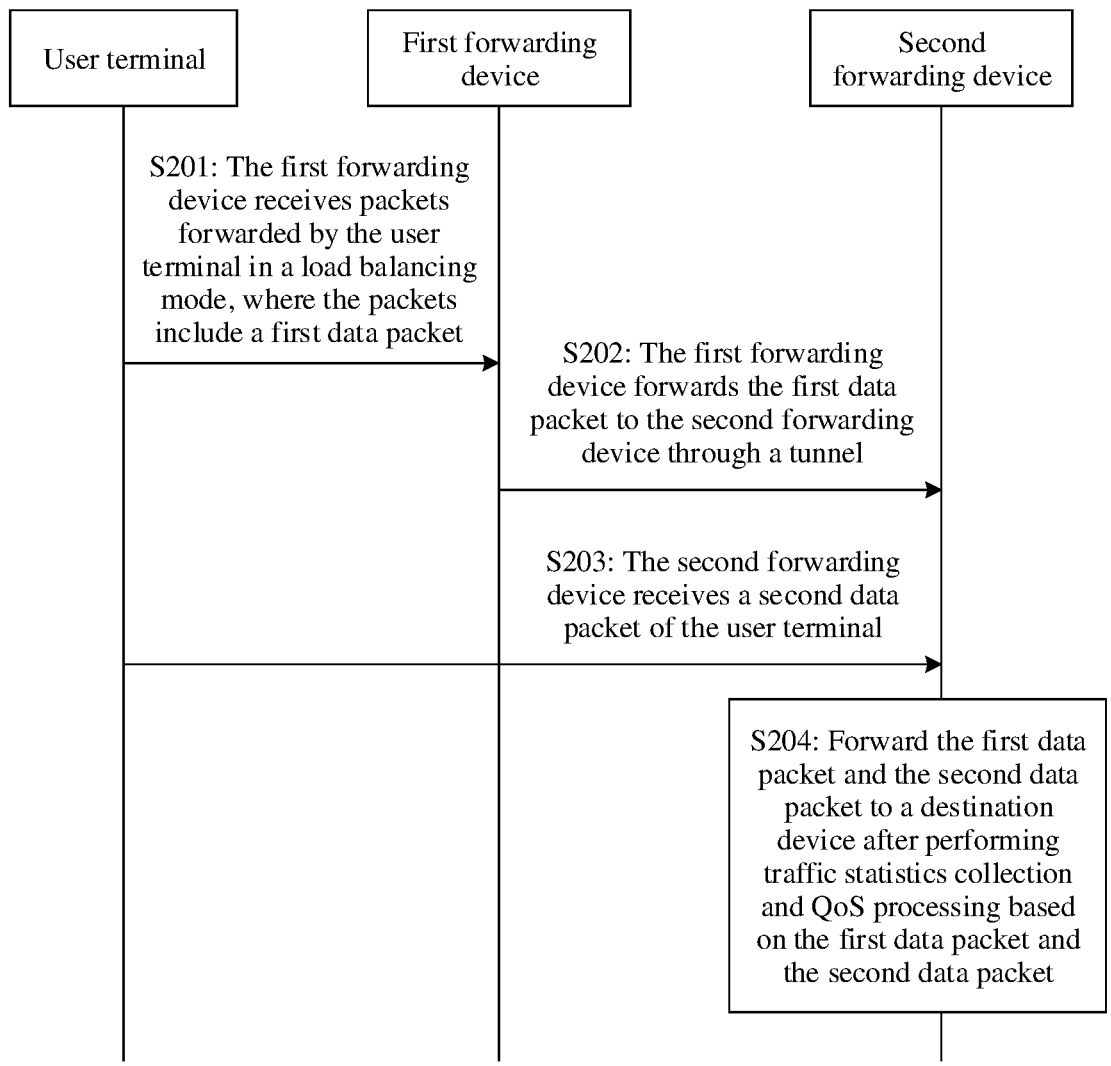
FIG. 7 is a schematic flowchart 2 of a packet transmission method according to an embodiment of this application.

In some embodiments, if the packets forwarded by the user terminal to the first forwarding device and the second forwarding device in the load balancing mode further include data packets, and the second forwarding device (the active forwarding device) is further configured to perform traffic statistics collection and quality of service (QoS) processing on the data packets, as shown in FIG. 7, an embodiment of this application provides still another packet transmission method. The method may include S201 to S204.

S201: A first forwarding device receives packets forwarded by a user terminal in a load balancing mode, where the packets include a first data packet.

The packets of the user terminal may further include data packets, and the data packets may include, for example, traffic data uploaded or downloaded by the user terminal. Performing traffic statistics collection on the data packets refers to calculating an amount of traffic to obtain real-time traffic data. QoS processing is a network traffic management capability of providing a better or special service for some users and/or applications while affecting services of other users or applications. A QoS processing technology can be used to grade user traffic. Further, QoS processing may be performed to provide different quality of service for different requirements of various user terminals. For example, QoS processing provides dedicated bandwidth, reduces a packet loss rate, manages network congestion, avoids network congestion, and limits a traffic rate, to properly allocate and use existing bandwidth. For example, if an internet access rate of 300.0 Mbps can meet a user requirement for an ordinary home broadband user terminal, rate limiting processing may be performed on data packets corresponding to the user terminal to limit bandwidth allocated to the user terminal, and more bandwidth is allocated to a device with a higher bandwidth requirement.

For example, the forwarding device may be configured to perform traffic statistics collection and QoS processing on the data packets transmitted by the user terminal. In this way, after receiving the packets that are transmitted by the user terminal and that pass through an SW/OLT on which a load balancing operation is performed, the first forwarding device queries user entry information, determines an active/standby status of the forwarding device for the user terminal that currently transmits the packets, and further determines whether the packets need to be forwarded.

For other content, refer to related descriptions of step S101. Details are not described herein again.

S202: The first forwarding device forwards the first data packet to a second forwarding device through a tunnel.

For example, after determining that the first forwarding device is a standby forwarding device of the user terminal that currently transmits the packets, the first forwarding device forwards the received data packet to the second forwarding device through a direct tunnel or a bypass tunnel between the first forwarding device and the second forwarding device, and the second forwarding device processes the received data packet.

For other content, refer to related descriptions of step S102. Details are not described herein again.

S203: The second forwarding device receives a second data packet of the user terminal.

For example, the user terminal transmits the data packet to the forwarding devices in the load balancing mode, and both the first forwarding device and the second forwarding device receive some of the data packets. This prevents load unbalancing of user-side links caused by transmitting traffic data on a single user-side link, for example, a user-side link 26A is overloaded and a user-side link 26B is underloaded.

S204: The second forwarding device forwards the first data packet and the second data packet to a destination device after performing traffic statistics collection and QoS processing based on the first data packet and the second data packet.

For example, after the second forwarding device obtains the first data packet and the second data packet in step S202 and step S203 respectively, that is, after the second forwarding device obtains complete data packets transmitted by the user terminal, the second forwarding device may further perform traffic statistics collection and QoS processing on the complete data packets. Then, traffic data obtained through processing is forwarded to the destination device corresponding to the first data packet and the second data packet. In addition, the second forwarding device is further configured to receive a backhaul data packet delivered by the destination device, and forward the backhaul data packet to the user terminal based on an obtained user route. For example, if the destination device may be the internet (internet), the second forwarding device forwards the complete data packets to the internet after performing rate limiting processing on the obtained complete data packets such as the traffic data, and forwards backhaul traffic to the user terminal. In this way, the user terminal goes online and accesses the network.

For example, as shown in FIG. 2(d), after the second forwarding device 23 receives the first data packet forwarded by the first forwarding device 22 through the tunnel 28 and the second data packet of the user terminal 21, and performs traffic statistics collection and QoS processing based on the first data packet and the second data packet, the second forwarding device 23 forwards the first data packet and the second data packet to the destination device 25. In addition, the second forwarding device 23 receives a backhaul data packet transmitted by the destination device 25, and the second forwarding device 23 forwards the backhaul data packet to the user terminal 21.

Therefore, according to the packet transmission method provided in this embodiment of this application, the tunnel is established between the first forwarding device and the second forwarding device, and it can be ensured that the user terminal can perform normal access when the packets of the user terminal are transmitted in the load balancing mode. This can improve utilization of the user-side link and reduce load on the user-side link.

Figure 8:
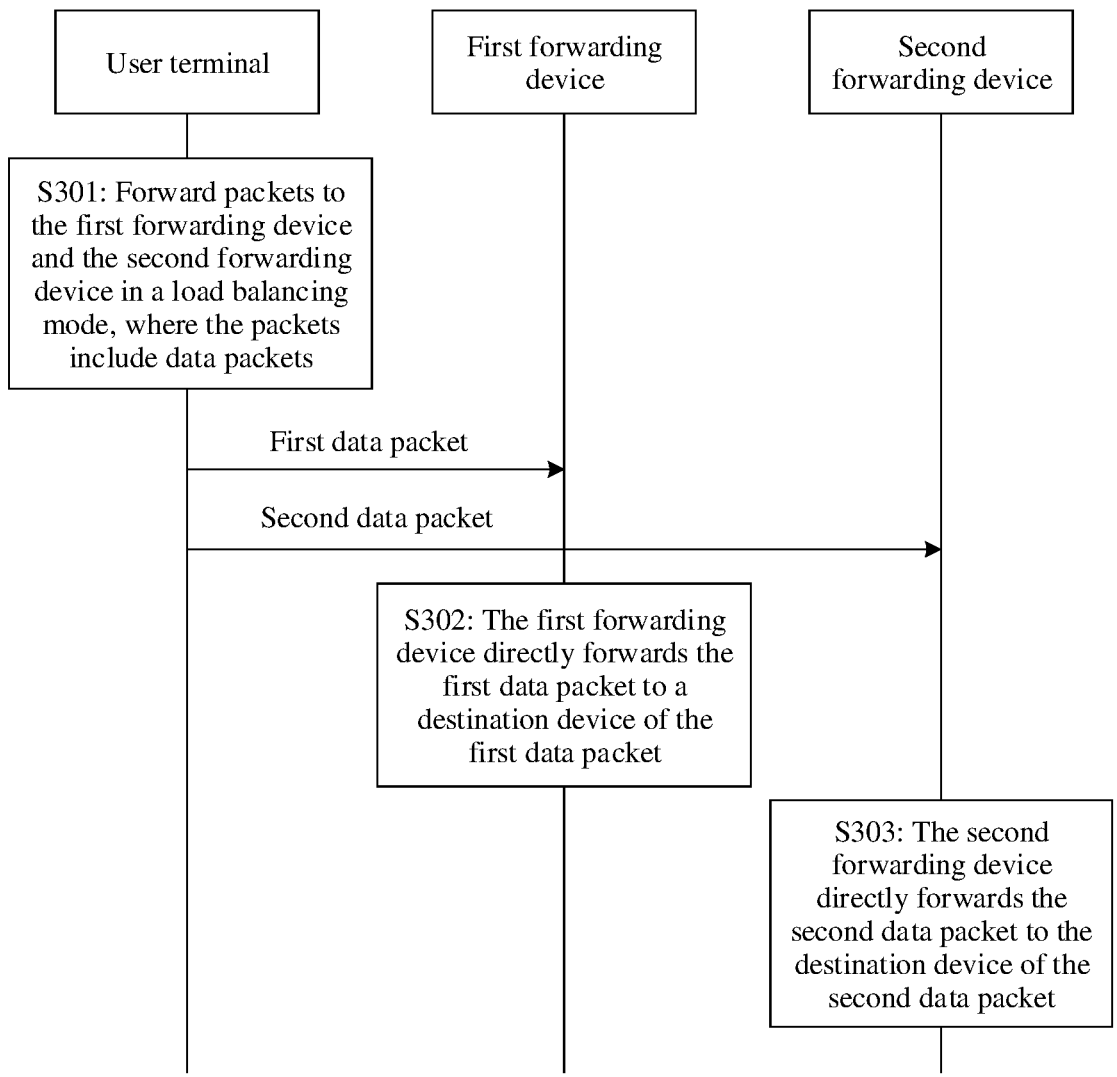
FIG. 8 is a schematic flowchart 3 of a packet transmission method according to an embodiment of this application.

In some embodiments, if the packets forwarded by the user terminal to the first forwarding device and the second forwarding device in the load balancing mode further include data packets, and the second forwarding device (the active forwarding device) is not configured to perform traffic statistics collection and QoS processing on the data packets, as shown in FIG. 8, an embodiment of this application provides still another packet transmission method. The method may include S301 to S303.

S301: A user terminal forwards packets to a first forwarding device and a second forwarding device in a load balancing mode, where the packets include data packets.

For example, functions of traffic statistics collection and QoS processing are not be configured on the forwarding devices, but are configured on an SW/OLT instead. In this way, the forwarding devices do not need to perform traffic statistics collection and QoS processing on the uplink data packets of the user terminal. The user terminal transmits the uplink data packets in the load balancing mode. In this way, the first forwarding device receives a first data packet, and the second forwarding device receives a second data packet.

S302: The first forwarding device directly forwards the first data packet to a destination device of the first data packet.

S303: The second forwarding device directly forwards the second data packet to the destination device of the second data packet.

For example, in step S302 and step S303, both the first data packet received by the first forwarding device and the second data packet received by the second forwarding device are packets that are transmitted in the load balancing mode after traffic statistics collection and QoS processing are performed on uplink data packets of the user terminal. In this way, the first forwarding device does not need to forward the received data packet to the second forwarding device through a tunnel, and the second forwarding device does not need to process the data packet after receiving the data packet forwarded by the first forwarding device. The first forwarding device and the second forwarding device may directly forward the received data packets to the destination device of the data packets. The destination device determines a corresponding active forwarding device based on the data packets, and then forwards a backhaul data packet through the active forwarding device.

Therefore, according to the packet transmission method provided in this embodiment of this application, the tunnel is established between the first forwarding device and the second forwarding device, and it can be ensured that the user terminal can perform normal access when the packets of the user terminal are transmitted in the load balancing mode. This can improve utilization of the user-side link and reduce load on the user-side link.

Figure 9:
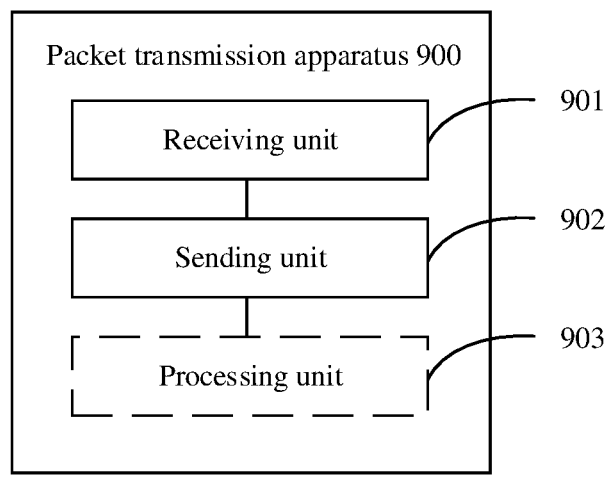
FIG. 9 is a schematic structural diagram 1 of a packet transmission apparatus according to an embodiment of this application.

FIG. 9 is a possible schematic structural diagram of a packet transmission apparatus in the foregoing embodiments. The packet transmission apparatus 900 includes a receiving unit 901 and a sending unit 902.

The receiving unit 901 is configured to support the packet transmission apparatus 900 to perform step S101 in FIG. 6, step S201 in FIG. 7, step S301 in FIG. 8, and/or another process of the technology described in this specification.

The sending unit 902 is configured to support the packet transmission apparatus 900 to perform step 2 of the negotiation process in the discovery phase in FIG. 4A, step S102 in FIG. 6, step S202 in FIG. 7, step S302 in FIG. 8, and/or another process of the technology described in this specification.

The packet transmission apparatus 900 may further include a processing unit 903, configured to support the packet transmission apparatus 900 to perform step 2 of the negotiation process in the discovery phase in FIG. 5A, step 7 of the negotiation process in the session phase in FIG. 5B, and/or another process of the technology described in this specification.

All related content of the steps in the foregoing method embodiments may be cited in function descriptions of corresponding functional units. Details are not described herein again.

Figure 10:
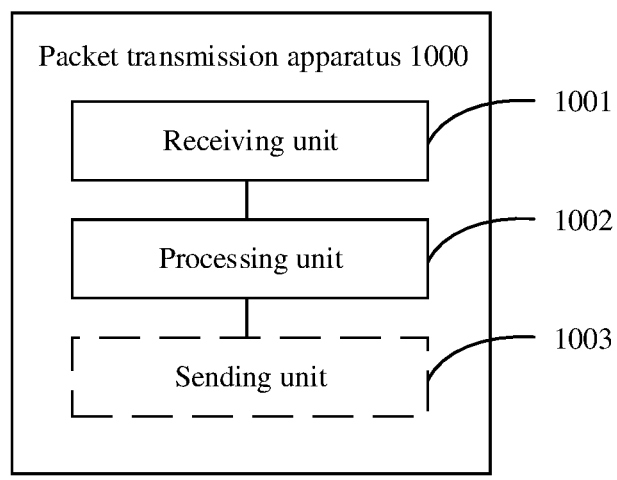
FIG. 10 is a schematic structural diagram 2 of a packet transmission apparatus according to an embodiment of this application.

FIG. 10 is a possible schematic structural diagram of a packet transmission apparatus in the foregoing embodiments. The packet transmission apparatus 1000 includes a receiving unit 1001 and a processing unit 1002.

The receiving unit 1001 is configured to support the packet transmission apparatus 1000 to perform step S203 in FIG. 7, step S301 in FIG. 8, and/or another process of the technology described in this specification.

The processing unit 1002 is configured to support the packet transmission apparatus 1000 to perform step 6 of the negotiation process in the session phase in FIG. 4B, step 2 of the negotiation process in the discovery phase in FIG. 5A, step 5 of the negotiation process in the session phase in FIG. 5B, step S103 in FIG. 6, step S204 in FIG. 7, and/or another process of the technology described in this specification.

The packet transmission apparatus 1000 may further include a sending unit 1003, configured to support the packet transmission apparatus 1000 to perform step 2 and step 5 of the negotiation process in the discovery phase in FIG. 4B, step 6 of the negotiation process in the session phase in FIG. 5B, step S303 in FIG. 8, and/or another process of the technology described in this specification.

All related content of the steps in the foregoing method embodiments may be cited in function descriptions of corresponding functional units. Details are not described herein again.

Figure 11:
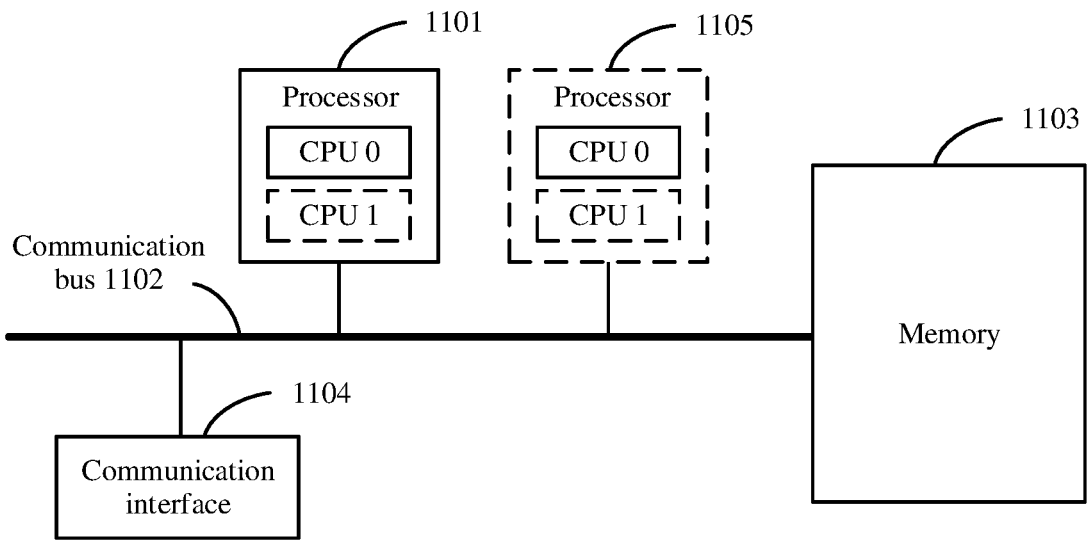
FIG. 11 is a schematic structural diagram of hardware of a packet transmission apparatus according to an embodiment of this application.

FIG. 11 is a schematic structural diagram of hardware of a packet transmission apparatus according to an embodiment of this application. The packet transmission apparatus may correspond to the packet transmission apparatus in FIG. 9 or the packet transmission apparatus in FIG. 10, and includes at least one processor 1101, a communication line 1102, a memory 1103, and at least one communication interface 1104. The memory 1103 may be further included in the processor 1101.

The processor 1101 may be a general-purpose central processing unit (CPU), a microprocessor, an application-specific integrated circuit (ASIC), or one or more integrated circuits configured to control program execution of the solutions of this application.

The communication line 1102 may include a path for transmitting information between the foregoing components.

The communication interface 1104 is configured to communicate with another device. In this embodiment of this application, the communication interface may be a module, a circuit, a bus, an interface, a transceiver, or another apparatus that can implement a communication function, and is configured to communicate with another device. Optionally, when the communication interface is a transceiver, the transceiver may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in this embodiment of this application.

The memory 1103 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, optical disc storage (including a compressed optical disc, a laser disc, an optical disc, a digital versatile optical disc, a Blue-ray optical disc, or the like), a magnetic disk storage medium or another magnetic storage device, or any other medium capable of carrying or storing expected program code in a form of instructions or data structures and capable of being accessed by a computer. This is not limited thereto. The memory may exist independently, and is connected to the processor 1101 through the communication line 1102. Alternatively, the memory 1103 may be integrated with the processor 1101.

The memory 1103 is configured to store computer-executable instructions used to implement the solutions of this application, and the processor 1101 controls execution of the computer-executable instructions. The processor 1101 is configured to execute the computer instructions stored in the memory 1103, to implement the method provided in the following embodiments of this application.

Optionally, the computer instructions in this embodiment of this application may also be referred to as application program code, instructions, computer programs, or other names. This is not specifically limited in this embodiment of this application.

In a specific implementation, in an embodiment, the processor 1101 may include one or more CPUs, for example, a CPU 0 and a CPU 1 in FIG. 11.

In specific implementation, in an embodiment, the packet transmission apparatus 1100 may include a plurality of processors, for example, the processor 1101 and a processor 1105 in FIG. 11. The processors each may be a single-core processor or a multi-core processor. The processor herein may be one or more devices, circuits, and/or processing cores configured to process data (for example, computer program instructions).

It should be noted that the foregoing packet transmission apparatus may be a general-purpose device or a dedicated device. A type of the packet transmission apparatus is not limited in this embodiment of this application. A structure shown in this embodiment of this application does not constitute any specific limitation on the packet transmission apparatus. In some other embodiments of this application, the packet transmission apparatus may include more or fewer components than those shown in the figure, or some components may be combined, or some components may be split, or different component arrangements may be used. The components shown in the figure may be implemented by hardware, software, or a combination of software and hardware.

Figure 12:
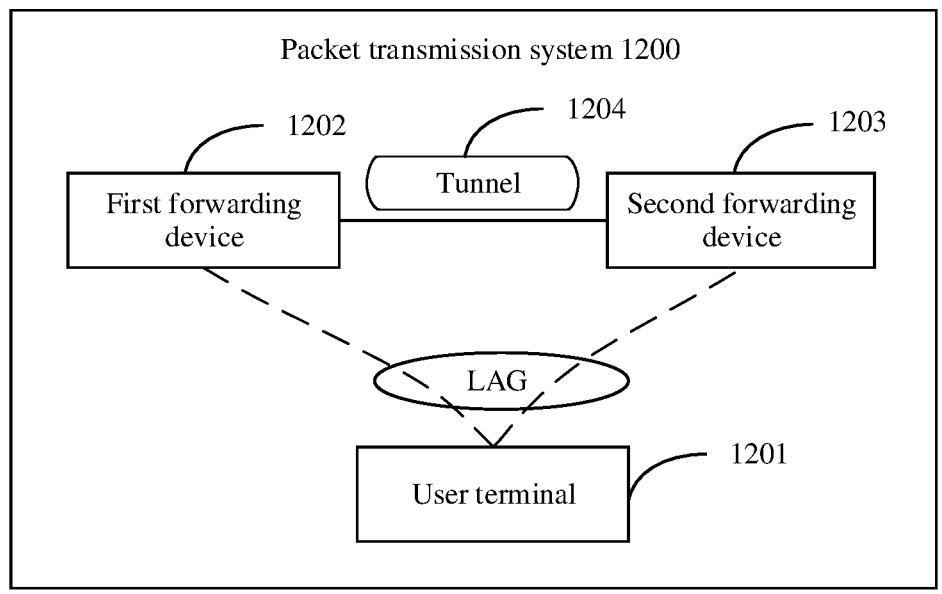
FIG. 12 is a schematic structural diagram of a packet transmission system according to an embodiment of this application.

An embodiment of this application provides a packet transmission system 1200. As shown in FIG. 12, the packet transmission system 1200 includes a user terminal 1201, a first forwarding device 1202, and a second forwarding device 1203. A tunnel 1204 is disposed between the first forwarding device 1202 and the second forwarding device 1203. Packets of the user terminal 1201 are forwarded to the first forwarding device 1202 and the second forwarding device 1203 in a load balancing mode (for example, by using an LAG technology).

The first forwarding device 1202 is configured to perform step S101 and step S102 in FIG. 6, step S201 and step S202 in FIG. 7, step S302 in FIG. 8, and/or another process of the technology described in this specification.

The second forwarding device 1203 is configured to perform step S103 in FIG. 6, step S203 and step S204 in FIG. 7, step S303 in FIG. 8, and/or another process of the technology described in this specification.

It may be understood that the packet transmission system 1200 may include more or fewer components than those shown in the figure, or some components may be combined, or some components may be split, or different component arrangements may be used. The components shown in the figure may be implemented by hardware, software, or a combination of software and hardware. All related content of the steps in the foregoing method embodiments may be cited in function descriptions of corresponding functional units. Details are not described herein again.

Figure 13:
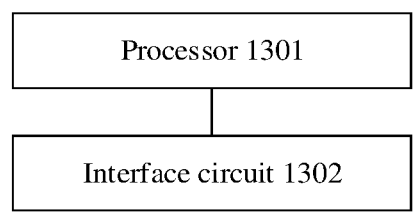
FIG. 13 is a schematic structural diagram of a chip system according to an embodiment of this application.

An embodiment of this application further provides a chip system. As shown in FIG. 13, the chip system includes at least one processor 1301 and at least one interface circuit 1302. The processor 1301 and the interface circuit 1302 may be interconnected through a line. For example, the interface circuit 1302 may be configured to receive a signal from another apparatus. For another example, the interface circuit 1302 may be configured to send a signal to another apparatus (for example, the processor 1301). For example, the interface circuit 1302 may read instructions stored in the memory, and send the instructions to the processor 1301. When the instructions are executed by the processor 1301, the packet transmission apparatus may be enabled to perform the steps in the packet transmission method in the foregoing embodiments. Certainly, the chip system may further include another discrete device. This is not specifically limited in this embodiment of this application.

An embodiment of this application further provides a computer-readable storage medium. The computer-readable storage medium stores instructions. When the instructions are run on a server, the server is enabled to perform the related method steps to implement the packet transmission method in the foregoing embodiments.

An embodiment of this application further provides a computer program product. When the computer program product is run on a computer, the computer is enabled to perform the foregoing related steps, to implement the packet transmission method in the foregoing embodiments.

In addition, an embodiment of this application further provides an apparatus. The apparatus may be specifically a component or a module, and the apparatus may include one or more connected processors and a memory. The memory is configured to store a computer program, and one or more computer programs include instructions. When the instructions are executed by the one or more processors, the apparatus is enabled to perform the packet transmission method in the foregoing method embodiments.

The apparatus, the computer-readable storage medium, the computer program product, or the chip provided in the embodiments of this application is configured to perform the corresponding method provided above. Therefore, for beneficial effects that can be achieved by the apparatus, the computer-readable storage medium, the computer program product, or the chip, refer to beneficial effects in the corresponding method provided above. Details are not described herein again.

The foregoing descriptions about implementations allow a person skilled in the art to clearly understand that, for purpose of convenient and brief description, division into the foregoing functional modules is merely used as an example for description. In an actual application, the foregoing functions may be allocated to different functional modules for implementation based on a requirement. In other words, an inner structure of an apparatus is divided into different functional modules to implement all or some of the functions described above. For a detailed working process of the foregoing systems, apparatuses, and units, refer to a corresponding process in the foregoing method embodiments. Details are not described herein again.

In the several embodiments provided in this application, it should be understood that the disclosed methods may be implemented in other manners. For example, the foregoing apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the method according to the embodiments of this application. The foregoing storage medium includes any medium that can store program instructions, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   receiving, by a first forwarding device, a dial-up request broadcast by a user terminal;
   receiving, by the first forwarding device, packets forwarded by the user terminal in a load balancing mode, wherein the packets comprise a keepalive packet from the user terminal, the keepalive packet indicating a status of the user terminal, the first forwarding device is a standby forwarding device corresponding to the user terminal, a network architecture comprises the user terminal, the first forwarding device, and a second forwarding device, and wherein a tunnel is between the first forwarding device and the second forwarding device, and packets of the user terminal are forwarded to the first forwarding device and the second forwarding device; and
   forwarding, by the first forwarding device, the keepalive packet indicating the status of the user terminal to the second forwarding device through the tunnel without the first forwarding device responding to the keepalive packet to the user terminal, wherein the second forwarding device is an active forwarding device corresponding to the user terminal, and
   wherein the network architecture further comprises a control device, and the method further comprises:
     sending, by the first forwarding device, the dial-up request to the control device; and
     receiving, by the first forwarding device, user entry information sent by the control device, wherein the user entry information indicates that the first forwarding device is the standby forwarding device corresponding to the user terminal,
   or
   wherein the method further comprises:
     obtaining, by the first forwarding device, the user entry information based on the dial-up request, wherein the user entry information indicates that the first forwarding device is the standby forwarding device corresponding to the user terminal.

2. The method according to claim 1, wherein the packets further comprise data packets, and the method further comprises:
   forwarding, by the first forwarding device, a first data packet to the second forwarding device through the tunnel when the second forwarding device performs traffic statistics collection and quality of service (QoS) processing on the data packets.

3. The method according to claim 1, wherein the packets further comprise data packets, and the method further comprises:
   directly forwarding, by the first forwarding device, a first data packet to a destination device of the first data packet when the second forwarding device does not perform traffic statistics collection and quality of service (QoS) processing on the data packets.

4. The method according to claim 1, wherein the user entry information is determined by the control device based on a media access control (MAC) address of the user terminal, or based on a first quantity of sessions of the first forwarding device and a second quantity of sessions of the second forwarding device.

5. A method, comprising:
   receiving, by a second forwarding device, packets forwarded by a first forwarding device through a tunnel, wherein the packets forwarded through the tunnel comprise a keepalive packet from a user terminal, the keepalive packet received by the second forwarding device indicating a status of the user terminal, a network architecture comprises the user terminal, the first forwarding device, and the second forwarding device, wherein the tunnel is between the first forwarding device and the second forwarding device, packets of the user terminal are forwarded to the first forwarding device and the second forwarding device, the second forwarding device is an active forwarding device corresponding to the user terminal, and the first forwarding device is a standby forwarding device corresponding to the user terminal;
   updating, by the second forwarding device, the status of the user terminal based on the keepalive packet, wherein the packets of the user terminal comprise data packets;
   receiving, by the second forwarding device, a first data packet forwarded by the first forwarding device through the tunnel;
   receiving, by the second forwarding device, a second data packet of the user terminal; and
   forwarding, by the second forwarding device, the first data packet and the second data packet to a destination device after performing traffic statistics collection and quality of service (QoS) processing based on the first data packet and the second data packet.

6. The method according to claim 5, wherein the network architecture further comprises a control device, and the method further comprises:
   before receiving, by the second forwarding device, the packets forwarded by the first forwarding device through the tunnel, receiving, by the second forwarding device, a dial-up request broadcast by the user terminal; and
   sending, by the second forwarding device, the dial-up request to the control device, and receiving user entry information sent by the control device, wherein the user entry information indicates that the second forwarding device is the active forwarding device corresponding to the user terminal.

7. An apparatus, comprising:
   one or more processors; and
   a memory, configured to store one or more computer programs, wherein the one or more computer programs comprise instructions which are executable by the one or more processors to cause the apparatus to:

receive a dial-up request broadcast by a user terminal;
receive packets forwarded by the user terminal in a load balancing mode, wherein the packets comprise a keepalive packet from the user terminal, the keepalive packet indicating a status of the user terminal, a network architecture comprises the user terminal, a first forwarding device including the apparatus, and a second forwarding device, wherein a tunnel is between the first forwarding device and the second forwarding device, packets of the user terminal are forwarded to the first forwarding device and the second forwarding device, and wherein the apparatus is the first forwarding device, and the first forwarding device is a standby forwarding device corresponding to the user terminal; and
forward the keepalive packet indicating the status of the user terminal to the second forwarding device through the tunnel without the apparatus responding to the keepalive packet to the user terminal, wherein the second forwarding device is an active forwarding device corresponding to the user terminal, and
wherein the network architecture further comprises a control device, and the instructions are executable by the one or more processors to further cause the apparatus to:
send the dial-up request to the control device; and
receive user entry information sent by the control device, wherein the user entry information indicates that the first forwarding device is the standby forwarding device corresponding to the user terminal,
or
wherein the instructions are executable by the one or more processors to further cause the apparatus to:
obtain the user entry information based on the dial-up request, wherein the user entry information indicates that the first forwarding device is the standby forwarding device corresponding to the user terminal.

8. The apparatus according to claim 7, wherein the packets further comprise data packets and the instructions are executable by the one or more processors to further cause the apparatus to:
forward the data packets to the second forwarding device through the tunnel when the second forwarding device performs traffic statistics collection and quality of service (QoS) processing on the data packets.

9. The apparatus according to claim 7, wherein the packets further comprise data packets and the instructions are executable by the one or more processors to further cause the apparatus to:
directly forward a first data packet to a destination device of the first data packet when the second forwarding device does not perform traffic statistics collection and quality of service (QoS) processing on the data packets.

10. An apparatus, comprising:
one or more processors; and
a memory, configured to store one or more computer programs, wherein the one or more computer programs comprise instructions which are executable by the one or more processors to cause the apparatus to:
receive packets forwarded by a first forwarding device through a tunnel, wherein a network architecture comprises a user terminal, the first forwarding device, and a second forwarding device including the apparatus, the tunnel is between the first forwarding device and the second forwarding device, packets of the user terminal are forwarded to the first forwarding device and the second forwarding device, wherein the apparatus is the second forwarding device, the packets forwarded through the tunnel comprise a keepalive packet from the user terminal, the keepalive packet received by the apparatus indicating a status of the user terminal, the second forwarding device is an active forwarding device corresponding to the user terminal, and the first forwarding device is a standby forwarding device corresponding to the user terminal;
update the status of the user terminal based on the keepalive packet, wherein the packets of the user terminal comprise data packets;
receive a first data packet forwarded by the first forwarding device through the tunnel;
receive a second data packet of the user terminal; and
forward the first data packet and the second data packet to a destination device after performing traffic statistics collection and quality of service (QoS) processing based on the first data packet and the second data packet.

11. The apparatus according to claim 10, wherein the network architecture further comprises a control device, and, and the instructions are executable by the one or more processors to further cause the apparatus to:
before receiving the packets forwarded by the first forwarding device through the tunnel, receive a dial-up request broadcast by the user terminal;
send the dial-up request to the control device; and
receive user entry information sent by the control device, wherein the user entry information indicates that the second forwarding device is the active forwarding device corresponding to the user terminal.

12. The apparatus according to claim 10, wherein the instructions are executable by the one or more processors to further cause the apparatus to:
before the second forwarding device receives the packets forwarded by the first forwarding device through the tunnel, receive a dial-up request broadcast by the user terminal; and
obtain user entry information based on the dial-up request, wherein the user entry information indicates that the second forwarding device is the active forwarding device corresponding to the user terminal.

* * * * *